United States Patent
Crum et al.

(10) Patent No.: US 11,401,177 B2
(45) Date of Patent: Aug. 2, 2022

(54) PASSIVE, GRAVITY-DRIVEN SYSTEM FOR TREATMENT OF AN EFFLUENT IN A DIAGNOSTIC SYSTEM

(71) Applicant: Ventana Medical Systems, Inc., Tucson, AZ (US)

(72) Inventors: Nathan Crum, Marana, AZ (US); Joseph M. Jakubowski, Georgetown, TX (US); Jerome W. Kosmeder, II, Tucson, AZ (US); Eric May, Oro Valley, AZ (US); Michael Otter, Tucson, AZ (US); Taylor J. Shingler, Tucson, AZ (US); Benjamin C. Stevens, Oro Valley, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 296 days.

(21) Appl. No.: 16/442,225

(22) Filed: Jun. 14, 2019

(65) Prior Publication Data

US 2019/0300392 A1   Oct. 3, 2019

Related U.S. Application Data

(63) Continuation of application No. PCT/US2017/067412, filed on Dec. 19, 2017.
(Continued)

(51) Int. Cl.
*C02F 1/32* (2006.01)
*C02F 1/72* (2006.01)
(Continued)

(52) U.S. Cl.
CPC ............... *C02F 1/325* (2013.01); *C02F 1/32* (2013.01); *C02F 1/722* (2013.01); *G01N 1/31* (2013.01);
(Continued)

(58) Field of Classification Search
CPC ............... C02F 1/32; C02F 1/72; G01N 1/31
See application file for complete search history.

(56) References Cited

U.S. PATENT DOCUMENTS

3,402,120 A   9/1968   Allen et al.
4,012,321 A   3/1977   Koubek
(Continued)

FOREIGN PATENT DOCUMENTS

CN   1406211 A    3/2003
CN   102015860 A   4/2011
(Continued)

OTHER PUBLICATIONS

International Search Report and Written Opinion dated Mar. 28, 2018 in corresponding PCT/US2017/067412 filed Dec. 19, 2017, pp. 1-17.
(Continued)

*Primary Examiner* — Walter D. Griffin
*Assistant Examiner* — Cameron J Allen
(74) *Attorney, Agent, or Firm* — Charney IP Law LLC; Thomas M. Finetti

(57) ABSTRACT

Automated systems to make target compounds from slide stainer waste streams inactive utilizing advanced oxidation processes are described herein. Advanced oxidation processes are promoted by UV irradiation and further accelerated by use of radical initiators, such as hydrogen peroxide. The automated systems further include mechanisms for segregating components of the waste streams.

27 Claims, 23 Drawing Sheets

Related U.S. Application Data

(60) Provisional application No. 62/435,987, filed on Dec. 19, 2016.

(51) Int. Cl.
  G01N 1/31 (2006.01)
  G01N 35/00 (2006.01)
  C02F 101/38 (2006.01)

(52) U.S. Cl.
  CPC .... G01N 35/00029 (2013.01); *C02F 2101/38* (2013.01); *C02F 2305/023* (2013.01); *G01N 2035/00277* (2013.01)

(56) References Cited

U.S. PATENT DOCUMENTS

| | | | |
|---|---|---|---|
| 5,268,104 A * | 12/1993 | Masoomain | B01D 53/1425 |
| | | | 208/235 |
| 5,595,707 A | 1/1997 | Copeland et al. | |
| 5,839,091 A | 11/1998 | Rhett et al. | |
| 6,096,271 A | 8/2000 | Bogen et al. | |
| 6,419,821 B1 | 7/2002 | Gadgil et al. | |
| 6,602,425 B2 | 8/2003 | Gadgil et al. | |
| 6,773,608 B1 | 8/2004 | Hallett et al. | |
| 7,178,386 B1 | 2/2007 | Gamble et al. | |
| 8,609,744 B2 | 12/2013 | Menozzi et al. | |
| 9,096,445 B2 | 8/2015 | Underwood | |
| 2002/0046569 A1 | 4/2002 | Faqih | |
| 2003/0211022 A1 | 11/2003 | Gross et al. | |
| 2005/0131266 A1 | 6/2005 | Carman et al. | |
| 2008/0179178 A1* | 7/2008 | Cabello | C02F 1/725 |
| | | | 204/157.44 |
| 2011/0192790 A1 | 8/2011 | Underwood | |
| 2014/0151294 A1* | 6/2014 | Prior | C02F 9/00 |
| | | | 210/605 |
| 2014/0319078 A1 | 10/2014 | Kling Miller | |

FOREIGN PATENT DOCUMENTS

| | | |
|---|---|---|
| CN | 104496094 A | 4/2015 |
| EP | 0976684 A1 | 2/2000 |
| KR | 101306155 B1 | 9/2013 |
| WO | 2001062672 A1 | 8/2001 |
| WO | 2009135783 A1 | 11/2009 |
| WO | 2011055133 A2 | 5/2011 |
| WO | WO2011055133 A2 | 5/2011 |
| WO | 2016141572 A1 | 9/2016 |
| WO | WO-2016171572 A1 * | 10/2016 ............. C02F 1/725 |

OTHER PUBLICATIONS

International Search Report and Written Opinion for PCT/US2017/067412 (WO/2018/118985), dated Mar. 28, 2018.

* cited by examiner

PASSIVE, GRAVITY-DRIVEN SYSTEM FOR TREATMENT OF AN EFFLUENT IN A DIAGNOSTIC SYSTEM

CROSS REFERENCE TO RELATED APPLICATIONS

The present application is a continuation of PCT/US2017/067412 filed on Dec. 19, 2017, which application claims the benefit of the filing date of U.S. Provisional Patent Application 62/435,987 filed Dec. 19, 2016, the disclosure of which are hereby incorporated by reference herein in their entireties.

FIELD OF THE INVENTION

The present invention relates to waste segregation and treatment practices for use with diagnostic instruments, more specifically, to the elimination of oil and other targeted materials in a waste solution.

BACKGROUND OF THE INVENTION

Immunohistochemistry ("IHC") detection systems can utilize 3,3'-diaminobenzidine ("DAB") as a chromogen, which is a substance that is capable of conversion into a pigment or dye to produce a colored end-product. However, DAB is a chemical with potential mutagenic and carcinogenic activity, and it increases the toxicity of waste streams from slide stainers used in IHC systems, which demands hazardous waste disposal. Currently technologies that address said waste disposal utilize waste segregation methods to minimize the volume of hazardous waste streams. Only two recommended methods exist for the treatment of DAB in IHC waste, and booth serve to only reduce the volume of hazardous waste. The first and most commonly used method involves the use of potassium permanganate and sulfuric acid to produce precipitates that may be filtered. The second method utilizes horseradish peroxidase to form a solid which is readily isolated by filtration. In both methods, while any remaining liquid is thought to be non-mutagenic, the precipitates or solids may still retain DAB's mutagenicity.

The present invention proposes automated systems to oxidize (i.e., make inactive) DAB in slide stainer waste streams utilizing advanced oxidation processes ("AOPs") with a radical generator (e.g. ultraviolet ("UV") light) and a radical initiator (e.g. hydrogen peroxide). AOPs generally exploit the high reactivity of HO radicals, which are formed by homolytic cleavage of hydrogen peroxide in the presence of UV light, to drive oxidation processes. Further, the present invention is configured to segregate both the DAB chromogen and liquid coverslip ("LCS") from the slide stainer waste stream. LCS is a prediluted coverslip solution used as a barrier between the reagents used in the IHC detection system and air, and is also an integrant in slide stainer waste streams.

Various waste treatment systems for collecting and reducing/removing contaminants from waste water via UV light irradiation have been proposed and are the subject of prior patents. For example, Rhett (U.S. Pat. No. 5,839,091) discloses dual waste bins for hazardous and nonhazardous waste storage. Two different waste pumps are used such that one waste pump is used to remove nonhazardous waste and the other waste pump is use to remove hazardous waste. A Switch (Swtch) step allows a user to indicate the switching of waste from one container to another. The Switch (Swtch) step is primarily used to separate hazardous waste from nonhazardous waste. However, Rhett does not teach any method of treating the wastes after collection.

Also, Bogen (U.S. Pat. No. 6,096,271) teaches means to collect toxic waste liquids in small volumes for economical disposal. Several liquid waste bottles are positioned in a parallel configuration, between the vacuum source and the aspiration head. Each liquid waste bottle inlet is normally closed off with a solenoid valve. When liquid is to be aspirated, a selected bottle's solenoid valve opens. The aspiration head is electromechanically lowered so that its bottom surface contacts the liquid on the microscope slide. In this manner, suction force is transmitted directly to the holes on the aspiration head, causing the liquid to be collected in the selected liquid waste bottle. However, Bogen does not feature any method of treating the liquid wastes after collection.

As another example, Underwood (U.S. Pat. No. 9,096,445) discloses a water purification apparatus having one or more water purification components disposed in a housing, where one of said components may be a UV light emitter. Contrary to the present invention, the Underwood invention is an active apparatus, driving waste fluid through the one or more components via one or more pumps, which also control the rate at which the purified water exits the apparatus. In contrast, the present device is a passive system, where the flow rate of waste water is gravity-controlled throughout the entire system. To illustrate, an initial flow rate of multiple fluid components entering the homogenizing reservoir (as well as the dimensions of said reservoir) yield a required flow rate of the fluid components. This flow rate provides a residence time necessary to evenly mix the fluid components, thus producing a homogenous effluent. It is well understood, by one of ordinary skill in the art, that irradiation of an effluent is most effective when the effluent is homogenous. Further still, the Underwood reference does not address the effective treatment of multi-component effluents.

Emery et al. (WO2011/055133) discloses an apparatus to be used in conjunction with a water purification system for controlling/eliminating a growth of microorganisms in said system. The Emery apparatus disposes one or more UV LEDs on or around a plurality of vulnerable points (e.g., water pathways or points of dispense of water outlets) in the system. The objective of the Emery apparatus is not to use light from the UV LEDs to purify waste water, but to combat the contamination of purified water (or water in the process of purification) by controlling/eliminating opportunist microorganisms attempting to access the purified water at the various vulnerable points. To illustrate, the Emery apparatus is used to provide ultra-purified water from purified water having a conductivity of less than 1 μS/cm. Thus, UV LEDs are able to be employed (i.e., since the emitted light is used for ultra-purification of purified water, lower wattages are needed) in lieu of UV lamps (emitting light of significantly higher wattage for purifying waste water), as is the case for the present invention. Moreover, the Emery reference does not enable a complete waste treatment system, only a mitigation technique for controlling/eliminating microorganism growth in waste treatment systems.

Further, Yanyan et al. (CN104496094) discloses a high-risk waste water treatment apparatus and a treatment method combining electrochemical degradation and photocatalytic oxidation to be used with electrochemical tanks. The photocatalytic oxidation comprises a UV light source. This reference is distinct from the present system both in constituting system components and as it leans on the synergistic effect of electrochemical degradation and photocatalytic technology to accomplish an effective treatment.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a passive, gravity-driven treatment system, operatively coupled to a diagnostic system, for treatment of a set of fluid components exiting the diagnostic system at a given flow rate. In some embodiments, the system comprises a homogenizing reservoir for receiving the set of fluid components. In further embodiments, the set of fluid components comprises a radical initiator, an aqueous component, and target compounds. A residence time of each fluid component within the homogenizing reservoir is sufficient for promoting an even mixing of the set of fluid components to form an effluent. The residence time may be a function of the given flow rate and dimensions (e.g., a radius, height, or volume) of the homogenizing reservoir.

In other embodiments, the system comprises a radical generator coupled to a radical generating reservoir. The effluent may be routed from the homogenizing reservoir to the radical generating reservoir via a channel, with gravity facilitating flow of the effluent. Once in the radical generating reservoir, the effluent is exposed to the radical generator. The radical initiator in the effluent activates AOPs that breakdown the target compounds. These AOPs are accelerated when the radical initiator in the effluent is exposed to the radical generator. In this way, detectable concentrations of the target compounds are diminished and the effluent becomes a treated effluent, which is then routed for disposal to a first disposal unit coupled to the radical generating reservoir via a fluid waste outlet, which provides a route for draining the effluent.

In further embodiments, the set of fluid components further comprises an oil component. As a result of buoyancy, the oil component rises above the aqueous component in the homogenizing reservoir and, as a result of gravity, the oil is drained from the homogenizing reservoir to a second disposal unit via an oil waste outlet.

In some aspects, the present invention proposes automated systems for DAB destruction by oxidizing (i.e., make inactive) DAB (i.e., the target compound) in slide stainer waste streams utilizing AOPs generated by UV light and hydrogen peroxide or another photoinitiator. No additional reagents were necessary, and no impact on the time to first result was observed. Other commercial solutions for DAB removal from IHC waste streams require additional reagents and hands-on processing of the DAB waste stream (i.e., chemical treatment, pH adjustment, filtration, etc.).

BRIEF DESCRIPTION OF THE DRAWINGS

The features and advantages of the present invention will become apparent from a consideration of the following detailed description presented in connection with the accompanying drawings in which.

DETAILED DESCRIPTION OF THE INVENTION

Figure 1:
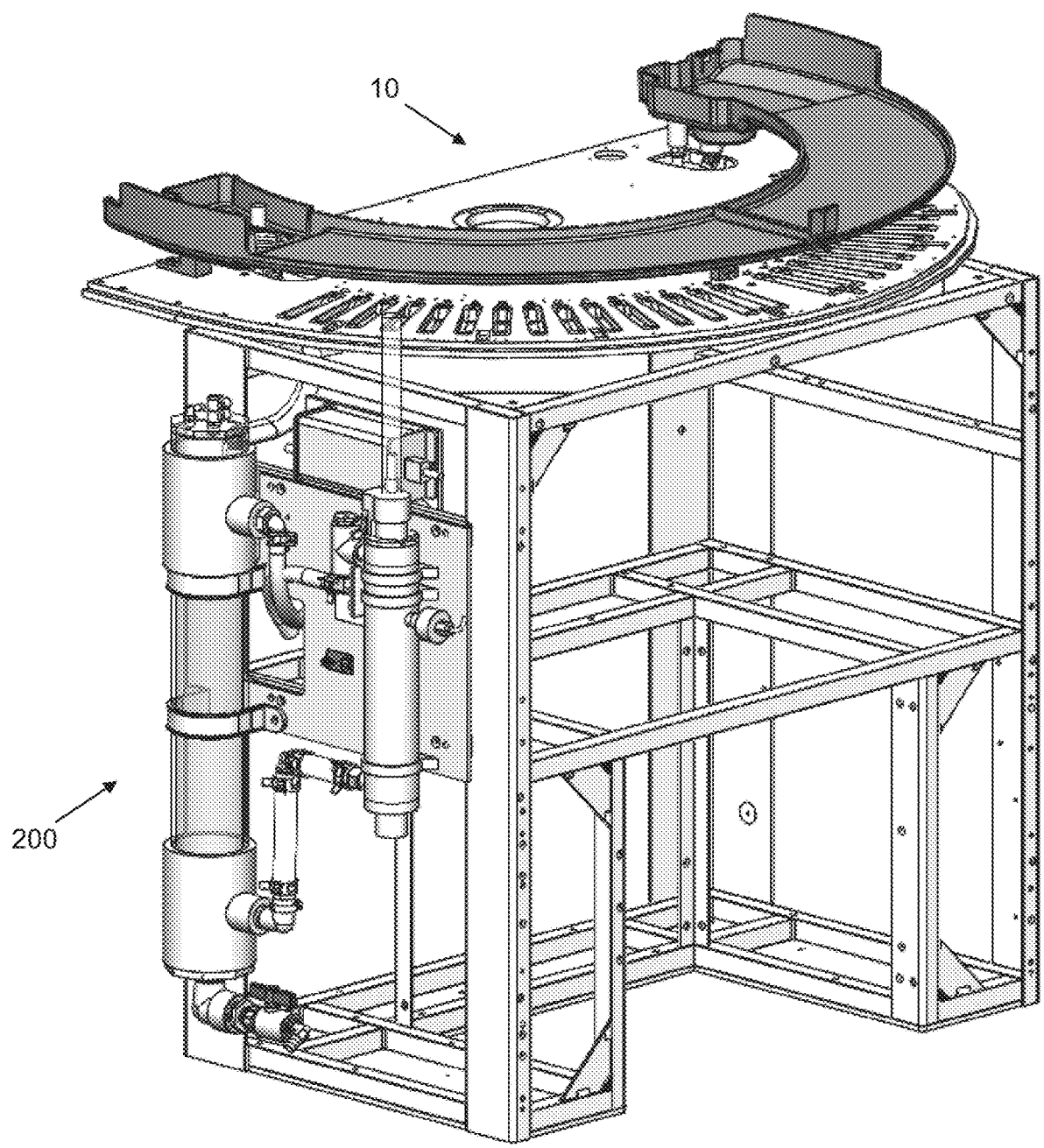
FIG. 1 shows a non-limiting embodiment of a treatment system of the present system mounted to a diagnostic system.

Following is a list of elements corresponding to a particular element referred to herein:
10 diagnostic system
200 passive, gravity-driven treatment system
201 homogenizing reservoir
202 channel
203 drain valve
204 radical generating reservoir
208 first disposal unit
209 second disposal unit
210 UV sensor
211 first outlet of homogenizing reservoir
212 oil waste outlet
213 inlet of radical generating reservoir
214 fluid waste outlet
215 base of the homogenizing reservoir
216 radical generator
217 base of the radical generating reservoir
219 line of separation between the aqueous component and the oil component
220 upper layer of oil effluent
222 lower layer of target effluent
230 oil weir
232 water weir
240 relative height checking tool Referring now to FIGS. 1-6, the present invention features a passive, gravity-driven treatment system (200), operatively coupled to a diagnostic system (10), for treatment of a waste stream exiting a diagnostic system (10), such as an automated staining machine. Some examples of automated staining machines (e.g., IHC/ISH slide stainers) include: itelliPATH (Biocare Medical), WAVE (Celerus Diagnostics), DAKO OMNIS and DAKO AUTOSTAINER LINK 48 (Agilent Technologies), BENCHMARK XT (Ventana Medical Systems, Inc.), BENCHMARK Special Stains (Ventana Medical Systems, Inc.), BENCHMARK ULTRA (Ventana Medical Systems, Inc.), BENCHMARK GX (Ventana Medical Systems, Inc.), VENTANA H&E 600 (Ventana Medical Systems, Inc.), VENTANA DISCOVERY XT (Ventana Medical Systems, Inc.), DISCOVERY ULTRA (Ventana Medical Systems, Inc.), Leica BOND, and Lab Vision Autostainer (Thermo Scientific). Automated staining machines (automated slide stainers) are also described by Prichard, Overview of Automated Immunohistochemistry, Arch Pathol Lab Med., Vol. 138, pp. 1578-1582 (2014), incorporated herein by reference in its entirety. Additionally, Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. The methods of the present invention may be adapted to be performed on any appropriate automated staining machine (or automated slide processing machine).

The slide processing machine can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

Automated IHC/ISH slide stainers typically include at least a stainer unit for dispensing reagent to implement staining protocols onto a slide. Commercially-available staining units typically operate on one of the following principles: (1) open individual slide staining, in which slides are positioned horizontally and reagents are dispensed as a puddle on the surface of the slide containing a tissue sample (such as implemented on the DAKO AUTOSTAINER Link 48 (Agilent Technologies) and intelliPATH (Biocare Medical) stainers); (2) liquid overlay technology, in which reagents are either covered with or dispensed through an inert fluid layer deposited over the sample (such as implemented on VENTANA BenchMark and VENTANA DISCOVERY stainers); (3) capillary gap staining, in which the slide surface is placed in proximity parallel to another surface (which may be another slide or a coverplate) to create a narrow gap, through which capillary forces draw up and keep liquid reagents in contact with the samples (such as the staining principles used by DAKO TECHMATE, Leica BOND, and DAKO OMNIS stainers). Some iterations of capillary gap staining do not mix the fluids in the gap (such as on the DAKO TECHMATE and the Leica BOND). In some variations of capillary gap staining, the reagents are mixed in the gap, such as translating gap technology, in which a gap is created between the slide and a curved surface and movement of the surfaces relative to one another effects mixing (see U.S. Pat. No. 7,820,381); and dynamic gap staining, which uses capillary forces similar to capillary gap staining to apply sample to the slide, and then translates the parallel surfaces relative to one another to agitate the reagents during incubation to effect reagent mixing (such as the staining principles implemented on DAKO OMNIS slide stainers (Agilent)). It has recently been proposed to use inkjet technology to deposit reagents on slides, as described in WO 2016-170008 A1. This list of staining principles is not intended to be exhaustive, and the present methods and systems are intended to include any staining technology (both known and to be developed in the future) that can be used to apply the appropriate reagents to the sample.

The slide processing machine can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. For example, a detectable reagent such as a chromogen, a fluorogenic compound, or a luminogenic compound is used in combination with a detectable moiety to generate a detectable signal (such as a visual, electrical, or other signal) that indicates the presence and/or concentration of the detectable moiety or label deposited on the sample.

The detectable signal can be generated by any known or yet to be discovered mechanism including absorption, emission and/or scattering of a photon (including radio frequency, microwave frequency, infrared frequency, visible frequency and ultra-violet frequency photons). Exemplary detectable moieties include (but are not limited to) chromogenic, fluorescent, phosphorescent, and luminescent molecules and materials, catalysts (such as enzymes) that convert one substance into another substance to provide a detectable difference (such as by converting a colorless substance into a colored substance or vice versa, or by producing a precipitate or increasing sample turbidity), haptens that can be detected through antibody-hapten binding interactions using additional detectably labeled antibody conjugates, and paramagnetic and magnetic molecules or materials. For instance, the detectable moiety is diaminobenzidine ("DAB"), a chromogen used in immunohistochemistry ("IHC") detection sytems to determine a presence or distribution of an antigen in a sample by detecting interaction of the antigen with a specific binding agent, such as an antibody.

The present invention is not limited to the use of automated systems. In some embodiments, the histochemical labeling methods described herein are applied manually. Or, particular steps may be performed manually while other steps are performed in an automated system.

In some embodiments, the waste streams of the aforementioned automated slide stainers, or slide processing machines, are routed to the passive, gravity-driven treatment system (200) of the present invention. Thus, it is one objective of the present invention to segregate said waste streams and deactivate target compounds, such as DAB. The system (200) of the present invention is advantageous in that it is readily mounted to an existing frame of the slide processing machines without needing alteration of the frame. Furthermore, the system (200) may be conveniently located so as to not adversely affect or interfere with workflow.

In other embodiments, a collector may be used for collecting the waste streams prior to entering the treatment system (200). In one embodiment, the collector may be statically connected to the treatment system (200) such that collected waste is directed to the systems (200). Alternatively, the collector may be actuated to selectively pre-separate fluid types via a diverter.

In some embodiments, the passive, gravity-driven treatment system (200) may comprise a homogenizing reservoir (201), a radical generating reservoir (204) fluidly connected to the homogenizing reservoir (201) via a channel (202), a radical generator (216) coupled to the radical generating reservoir (204), a first disposal unit (209) coupled to a waste outlet (214) of the radical generating reservoir, and a second disposal unit (209) coupled to an oil waste outlet (212) of the homogenizing reservoir. In some embodiments, the homogenizing reservoir (201) may be fluidly connected to the diagnostic system (10). The homogenizing reservoir (201) can receive a radical initiator and the waste stream. In some embodiments, the waste stream comprises an oil-phase fluid component and an aqueous fluid component containing at least one target compound. As a result of buoyancy, the oil-phase fluid component rises and floats above the aqueous fluid component when in the homogenizing reservoir (201) so as to form an upper layer of oil effluent (220) and a lower layer of target effluent (222), with the radical initiator in the target effluent.

In some embodiments, a residence time of each fluid component in the homogenizing reservoir (201) is sufficient for separating the oil-phase fluid component from the aqueous fluid component. Further still, the residence time is sufficient to ensure an even mixing of the aqueous fluid component and the radical initiator such that the target effluent is homogenous at least at a first outlet (211) of the homogenizing reservoir. The residence time may be a function of the given flow rate and dimensions of the homogenizing reservoir (201). For example, if the homogenizing reservoir (201) is substantially cylindrical, the dimensions of the homogenizing reservoir (201) comprise a height and a radius of the homogenizing reservoir (201).

Figure 2:
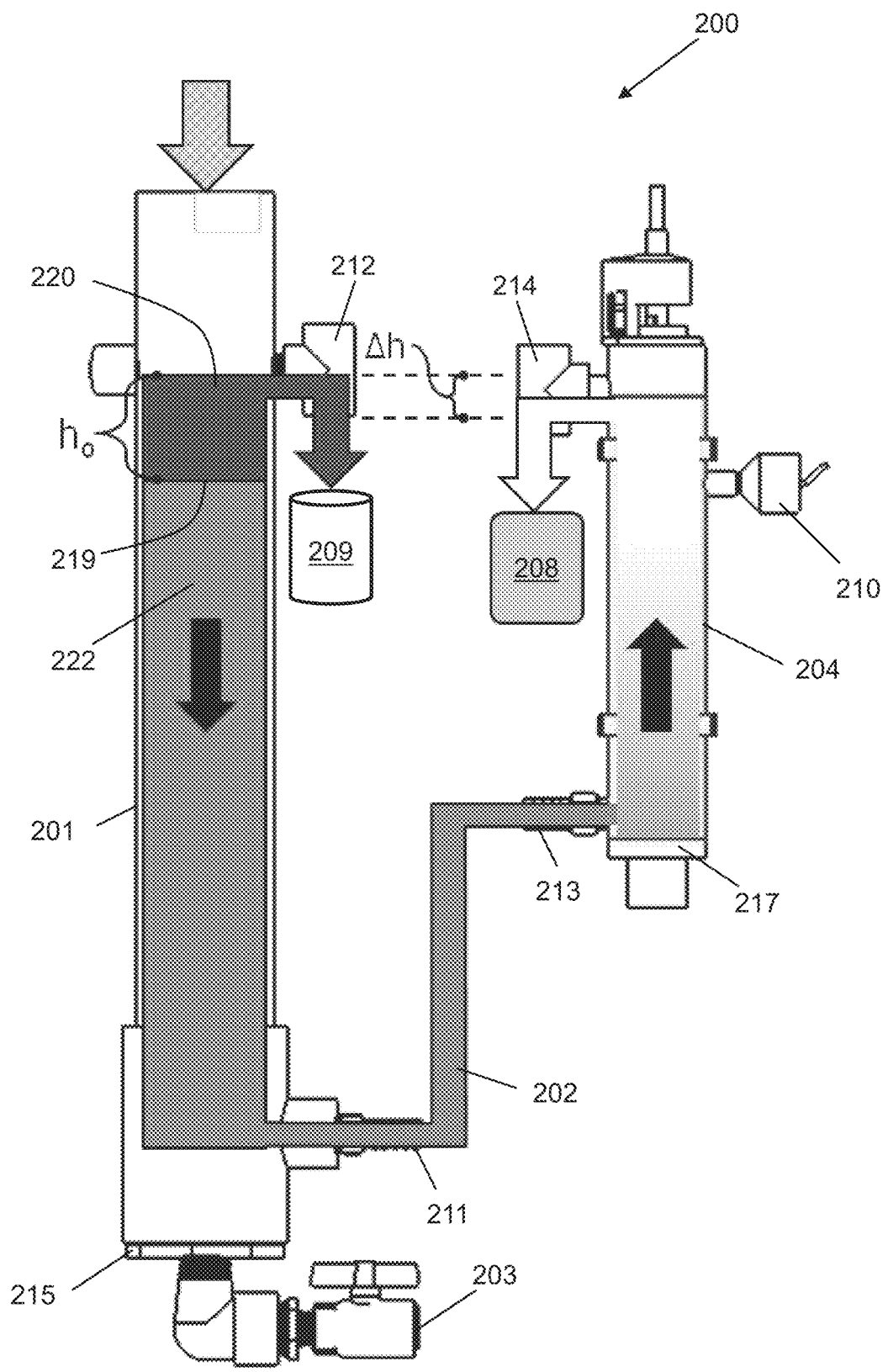
FIG. 2 shows fluid flow and oil separation of the effluent in the treatment system

In some embodiments, the channel (202) may be connected to the first outlet (211) of the homogenizing reservoir and to an inlet (213) of the radical generating reservoir (204). As shown in FIG. 2, the first outlet (211) may be positioned near a base (215) of the homogenizing reservoir and the inlet (213) may be positioned at or near a base (217) of the radical generating reservoir. Thus, as facilitated by gravity, the target effluent is configured to flow from the homogenizing reservoir (201) to the radical generating reservoir (204) via the channel (202). When the target effluent is in the radical generating reservoir (204), the radical generator (216) is configured to irradiate the target effluent and promote advanced oxidation processes (AOPs) that breakdown said target compound. The radical initiator in the target effluent is effective for accelerating said AOPs when the radical initiator is exposed to the radical generator (216), thus reducing a detectable concentration of the target compound and the target effluent becomes a treated effluent.

In other embodiments, the first disposal unit (208) receives the treated effluent exiting from the waste outlet (214) of the radical generating reservoir. In still other embodiments, the second disposal unit (209) receives the oil effluent exiting from the oil waste outlet (212) of the homogenizing reservoir. The oil waste outlet (212) may be positioned above the lower layer of target effluent so as to provide a route for drainage of the oil effluent from the homogenizing reservoir (201) and prevent the target effluent from exiting through the oil waste outlet (212). In some embodiments, draining of the oil effluent is facilitated by gravity.

According to another embodiment, the system (200) may be utilized in a method for treating a waste stream exiting a diagnostic system (10). The waste stream may comprise an oil-phase fluid component and an aqueous fluid component containing at least one target compound. In some embodiments, the method may comprise providing the passive, gravity-driven treatment system (200) operatively coupled to the diagnostic system (10), providing a radical initiator, and introducing the waste stream from the diagnostic system (10) and the radical initiator into the homogenizing reservoir (201). As a result of buoyancy, the oil-phase fluid component rises and floats above the aqueous fluid component when in the homogenizing reservoir (201) so as to form an upper layer of oil effluent and a lower layer of target effluent, with the radical initiator is disposed in the target effluent. The method may further comprise introducing the target effluent from the homogenizing reservoir (201) into the radical generating reservoir (204) via the channel (202), with gravity facilitating flow of the target effluent from the homogenizing reservoir (201) to the radical generating reservoir (204), and irradiating the target effluent, via the radical generator (216), while the target effluent is disposed in the radical generating reservoir (204).

Irradiation of the target effluent causes advanced oxidation processes (AOPs) that breakdown said target compound. Moreover, the radical initiator can accelerate said AOPs when the radical initiator is exposed to the radical generator (216), thus reducing a detectable concentration of the target compound and the target effluent becomes a treated effluent. In further embodiments, the method may further comprise draining the treated effluent exiting from the waste outlet (214) of the radical generating reservoir (204) into the first disposal unit (208), and draining the oil effluent exiting from oil waste outlet (212) of the homogenizing reservoir (201) into the second disposal unit (209). In some embodiments, draining of the oil effluent is facilitated by gravity.

According to another embodiment, the passive, gravity-driven treatment system (200), operatively coupled to the diagnostic system (10), may comprise the homogenizing reservoir (201), the radical generating reservoir (204), the radical generator (216), and the first disposal unit (208). In some embodiments, the homogenizing reservoir (201) may be fluidly connected to the diagnostic system (10). The homogenizing reservoir (201) can receive the radical initiator and a waste stream exiting the diagnostic system (10) at a given flow rate. The waste stream may comprise a set of fluid components comprising an aqueous component containing one or more target compounds. A residence time of each fluid component in the homogenizing reservoir (201) may be sufficient for promoting an even mixing of the set of fluid components to form a homogenous target effluent at or near a first outlet (211) of the homogenizing reservoir. The residence time may be a function of the given flow rate and dimensions of the homogenizing reservoir (201), such as a height, a cross-sectional surface area, and a volume of the homogenizing reservoir (201).

The target effluent can be routed to the radical generating reservoir (204) from the homogenizing reservoir (201) via the channel (202). In some embodiments, the flow of the target effluent from the homogenizing reservoir (201) to the radical generating reservoir (204) is facilitated by gravity. The radical generator (216), which is coupled to the radical generating reservoir (204), may be configured to irradiate the target effluent while the target effluent is disposed in the radical generating reservoir (204), and promote advanced oxidation processes (AOPs) that breakdown said target compounds. In some embodiments, the radical initiator may be effective for accelerating said AOPs when the radical initiator is exposed to the radical generator (216), thus reducing a detectable concentration of the target compound and the target effluent becomes a treated effluent. The first disposal unit (208) may be coupled to the radical generating reservoir, to receive the treated effluent exiting from a waste outlet (214) of the radical generating reservoir.

In other embodiments, the set of fluid components may further comprise an oil component. When in the homogenizing reservoir (201), the oil component rises and floats above the aqueous component as a result of buoyancy. The oil component may be separately collected from the target effluent by draining it from an oil waste outlet (212) of the homogenizing reservoir (201). The system (200) may further include a second disposal unit (209) coupled to the oil waste outlet (212) for collecting the drained oil component. In some embodiments, the draining of the oil component is facilitated by gravity.

In some embodiments, a line of separation (219) between the aqueous component and the oil component in the homogenizing reservoir (201) may be calculated based on a density of the aqueous component, $\rho_w$, and a density of the oil component, $\rho_w$. This line may be used to determine placement of the waste outlet (214) as well as placement (height) of the radical generating reservoir (204) relative to the homogenizing reservoir (201). As shown in FIG. 2, a first height, $h_0$, between the line of separation and a topmost location of the oil waste outlet (212), can determine a second height, $\Delta h$, between the topmost location of the oil waste outlet (212) and a topmost location of the waste outlet (214) of the radical generating reservoir (204). In some embodiments, $\Delta h$ is calculated as follows:

$$\Delta h = h_0 \left[1 - \frac{\rho_0}{\rho_w}\right],$$

which determines the position of the waste outlet (214) relative to the oil waste outlet (212). In some embodiments, $\Delta h$ may range from about 0.5-1.5 inches.

According to yet another embodiment, the system (200) may be utilized in a method for treating a waste stream comprising a set of fluid components having an aqueous component containing one or more target compounds. In some embodiments, the method may comprise providing a passive, gravity-driven treatment system (200) operatively coupled to the diagnostic system (10), providing a radical initiator, and introducing, into the homogenizing reservoir (201), the radical initiator and the waste stream exiting the diagnostic system (10) at a given flow rate. In some embodiments, the residence time of each fluid component in the homogenizing reservoir (201) may be sufficient for promoting an even mixing of the set of fluid components to form a homogenous target effluent at or near a first outlet (211) of the homogenizing reservoir.

In some embodiments, the method may further comprise introducing the target effluent from the homogenizing reservoir (201) into the radical generating reservoir (204) via the channel (202), and irradiating the target effluent, via the radical generator (216), while the target effluent is disposed in the radical generating reservoir (204). In some embodiments, the flow of the target effluent from the homogenizing reservoir (201) to the radical generating reservoir (204) is facilitated by gravity. In some embodiments, irradiation of the target effluent causes advanced oxidation processes (AOPs) that breakdown said target compound. The radical initiator may further accelerate said AOPs when the radical initiator is exposed to the radical generator (216), thus reducing a detectable concentration of the target compound and the target effluent becomes a treated effluent. In still further embodiments, the method may comprise draining the treated effluent exiting from the waste outlet (214) of the radical generating reservoir (204) into the first disposal unit (208).

In other embodiments, the set of fluid components may further comprise an oil component. When the oil component is in the homogenizing reservoir (201), the oil component can rise and float above the aqueous component as a result of buoyancy. Thus, the method may also further comprise draining the oil component exiting from an oil waste outlet (212) of the homogenizing reservoir into a second disposal unit (209). In some embodiments, the draining of the oil component may be facilitated by gravity.

According to still other embodiments, the passive, gravity-driven treatment system (200) may comprise the homogenizing reservoir (201) fluidly connected to the diagnostic system (10), the radical generating reservoir (204), and the radical generator (216). The homogenizing reservoir (201) may be configured for receiving a waste stream comprising at least one target compound and one or more fluid components. In some embodiments, a residence time of each fluid component in the homogenizing reservoir (201) may be sufficient for promoting one or more of the following: i) an even mixing of aqueous fluid components to form an aqueous effluent; ii) an even mixing of non-aqueous fluid components to form a non-aqueous effluent; or iii) separation of the non-aqueous effluent from the aqueous effluent.

For example, in one embodiment, if the fluid components are all non-aqueous, then the residence time has to be sufficient for promoting an even mixing of the non-aqueous fluid components to form a non-aqueous effluent. In another embodiment, if the fluid components are all aqueous, then the residence time has to be sufficient for promoting an even mixing of the aqueous fluid components to form an aqueous effluent. In yet another embodiment, if the fluid components are a combination of both non-aqueous and aqueous fluid components, then the residence time has to be sufficient for promoting an even mixing of non-aqueous fluid components to form a non-aqueous effluent, an even mixing of the aqueous fluid components to form an aqueous effluent, as well as separation of the non-aqueous effluent from the aqueous effluent.

In some embodiments, the residence time may be a function of a given flow rate of the one or more fluid components and dimensions of the homogenizing reservoir (201). The dimensions of the homogenizing reservoir (201) may include a height, a cross-sectional surface area, and a volume of the homogenizing reservoir (201).

In some embodiments, the target compound may be disposed in either the non-aqueous effluent or the aqueous effluent, and said effluent containing the target compound is hereinafter referred to as the target effluent. In some embodiments, the radical generating reservoir (204) receives the target effluent from the homogenizing reservoir (201) via a channel (202) fluidly connecting the reservoirs. Gravity may facilitate the flow of the target effluent from the homogenizing reservoir (201) to the radical generating reservoir (204). In other embodiments, the radical generator (216), which is coupled to the radical generating reservoir (204), can irradiate the target effluent while the target effluent is disposed in the radical generating reservoir (204), and promote advanced oxidation processes (AOPs) that breakdown said target compound, thereby reducing a detectable concentration of the target compound and the target effluent becomes a treated effluent.

In some embodiments, the system (200) may further include a radical initiator that is added into the homogenizing reservoir (201), together or separate from the waste stream. In other embodiments, the radical initiator is disposed in the target effluent such that the radical initiator can accelerate the AOPs when the radical initiator is exposed to the radical generator.

In other embodiments, the system (200) may further comprise a first disposal unit (208) fluidly coupled to a waste outlet (214) of the radical generating reservoir for receiving the treated effluent. In still other embodiments, the system (200) may further comprise a second disposal unit (209) fluidly coupled to a waste outlet (212) of the homogenizing reservoir for receiving the effluent without the target compound exiting from the homogenizing reservoir (201). In some embodiments, the effluent without the target compound can exit the homogenizing reservoir (201) by gravity-facilitated draining.

According to a further embodiment, the system (200) may be utilized in a method for treating a waste stream comprising at least one target compound and one or more fluid components. The method may comprise providing the passive, gravity-driven treatment system (200) operatively coupled to the diagnostic system (10), and introducing the waste stream from the diagnostic system (10) into the homogenizing reservoir (201). In some embodiments, a residence time of each fluid component in the homogenizing reservoir (201) is sufficient for promoting one or more of the following: i) an even mixing of aqueous fluid components to form an aqueous effluent; ii) an even mixing of non-aqueous fluid components to form a non-aqueous effluent; or iii) separation of the non-aqueous effluent from the aqueous effluent. The residence time may be a function of a given flow rate of the one or more fluid components and dimensions of the homogenizing reservoir (201), such as a height, a cross-sectional surface area, and a volume of the homogenizing reservoir (201).

In some embodiments, the target compound may be disposed in either the non-aqueous effluent or the aqueous effluent, and said effluent containing the target compound is hereinafter referred to as the target effluent. The method continues by introducing the target effluent into the radical generating reservoir (204) via the channel (202), and irradiating the target effluent, via the radical generator (216), while the target effluent is disposed in the radical generating reservoir (204). In some embodiments, gravity can facilitate flow of the target effluent from the homogenizing reservoir (201) to the radical generating reservoir (204). In other embodiments, irradiation of the target effluent can result in advanced oxidation processes (AOPs) that breakdown said target compound, thereby reducing a detectable concentration of the target compound and the target effluent becomes a treated effluent.

In still other embodiments, the method may further comprise introducing a radical initiator into the homogenizing reservoir (201). The radical initiator may be disposed in the target effluent and introduced into the radical generating reservoir (204) where the radical initiator can accelerate the AOPs when the radical initiator is exposed to the radical generator (216).

In further embodiments, the method may comprise draining the treated effluent exiting from the waste outlet (214) of the radical generating reservoir into the first disposal unit (208). In yet further embodiments, the method may comprise draining the effluent without the target compound exiting from a waste outlet (212) of the homogenizing reservoir into the second disposal unit (209).

In accordance with the systems (200) and methods described above, one of ordinary skill in the art would understand that the composition of the aqueous fluid component can vary along a length of the homogenizing reservoir, particularly near the inlet where the streams are being received. However, the residence time of the aqueous fluid component in the homogenizing reservoir may be sufficient to promote an even mixing such that equilibrium is achieved at the first outlet (211) of the homogenizing reservoir or nearby regions thereof. As used herein, the phrase "even mixing" refers to mixing that provides a homogeneous solution. One skilled in the art can determine at which location in the reservoir is even mixing achieved based on fluid flow principles and dynamics, such as by using the flow rates, diffusion coefficients of the components of the aqueous fluid, and the dimensions of the reservoir. In some embodiments, the residence time for even mixing can range from 20 to 120 minutes. In one embodiment, even mixing can occur at or near the first outlet (211). In another embodiment, even mixing can occur at regions near the first outlet (211). In yet another embodiment, even mixing can occur at regions near the inlet homogenizing reservoir. In further embodiments, if the fluid components separate into layers, even mixing can occur at regions near the line of separation. In non-limiting embodiments, one would be able to determine that the aqueous fluid component is evenly mixed by testing the composition of the aqueous fluid component at the outlet and along various heights of the reservoir.

Consistent with the aforementioned systems (200) and methods, an example of the target compound is 3,3'-diaminobenzidine (DAB). In some embodiments, the system and methods of the present invention may be effective for neutralizing DAB or significantly reducing its concentration to comply with local regulations. For example, the present invention is capable of neutralizing DAB such that a maximum concentration of remaining DAB ranges from 10 ppb to 130 ppb. In other embodiments, the fluid components may further comprise a biofilm or partially dried sludge.

Consistent with the embodiments of the systems (200) and methods described herein, the radical initiator may be a UV peroxide photoinitiator, a thermal peroxide initiator, an azo thermal/photolysis initiator, a nitroxide radical initiator, or an organic photosensitizer. In some embodiments, the radical initiator may comprise a single initiator or multiple initiators. In other embodiments, inorganic semiconductor nanomaterials may also be used as radical initiators, such as $TiO_2$, $SnO_2$, $ZnO$, $Fe_2O_3$, $CdS$, etc. For example, the inorganic materials may be used alone or in combination with another initiator. These inorganic materials may coat a portion of the radical generator (i.e., to form an inorganic semiconductor coating). In some embodiments, the radical initiator is not necessarily required to oxidize targeted compounds in the aqueous component; the function of the radical initiator is to accelerate the destructive AOPs.

In one embodiment, the radical initiator is a component of the waste stream exiting the diagnostic system (10). While the radical initiator is not necessarily an integrant of the waste stream, the radical initiator may be introduced into the waste stream before entering the homogenizing reservoir (201). In an alternative embodiment, the radical initiator is introduced into the homogenizing reservoir (201) in a stream separate from the waste stream. In this case, the radical initiator may be introduced prior to the waste stream entering the homogenizing reservoir (201).

Figure 4:
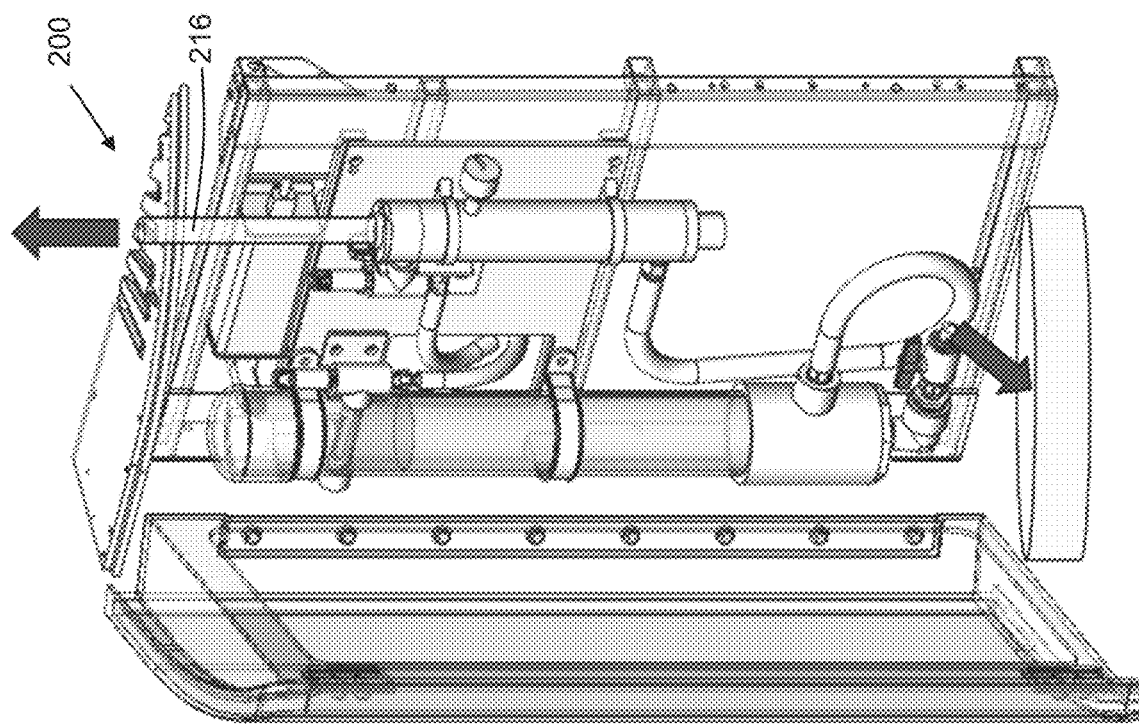
FIG. 4 shows the treatment system during service and maintenance. The system is accessible via a hinged cover skin and a shallow pan may be placed beneath a drain valve for draining the system. A bulb and/or tube in a radical generator may be removed and replaced as depicted.
Figure 3:
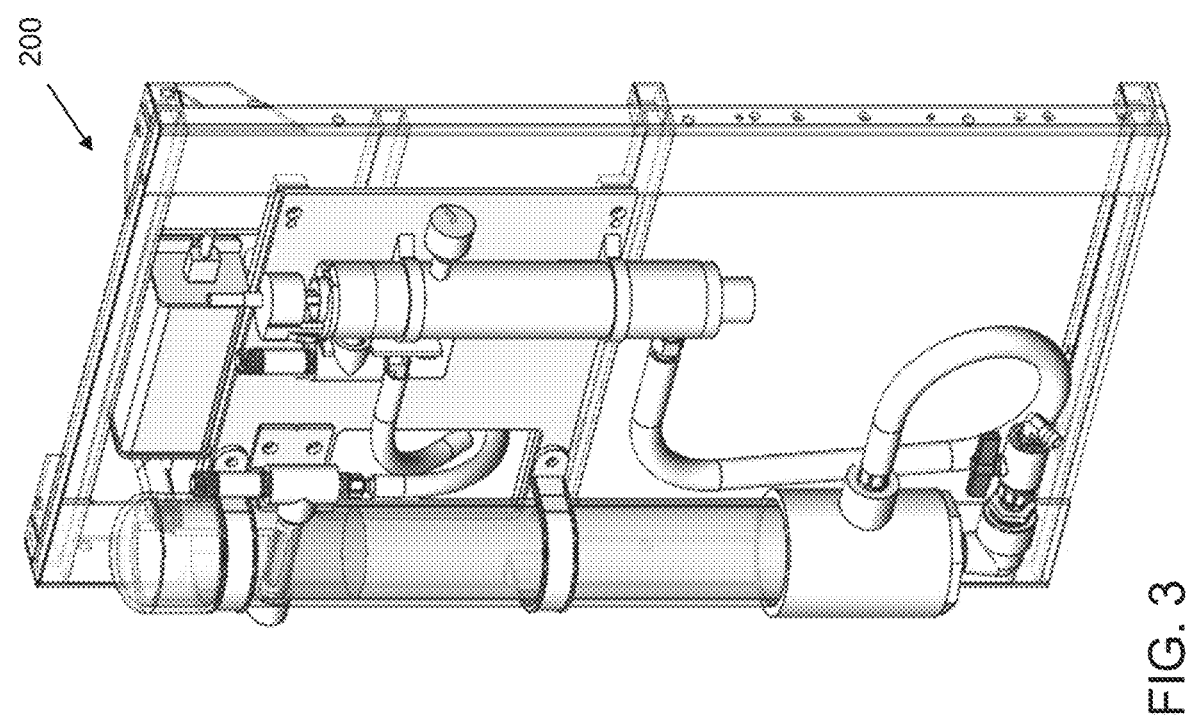
FIG. 3 shows another view of the treatment system.
Figure 6:
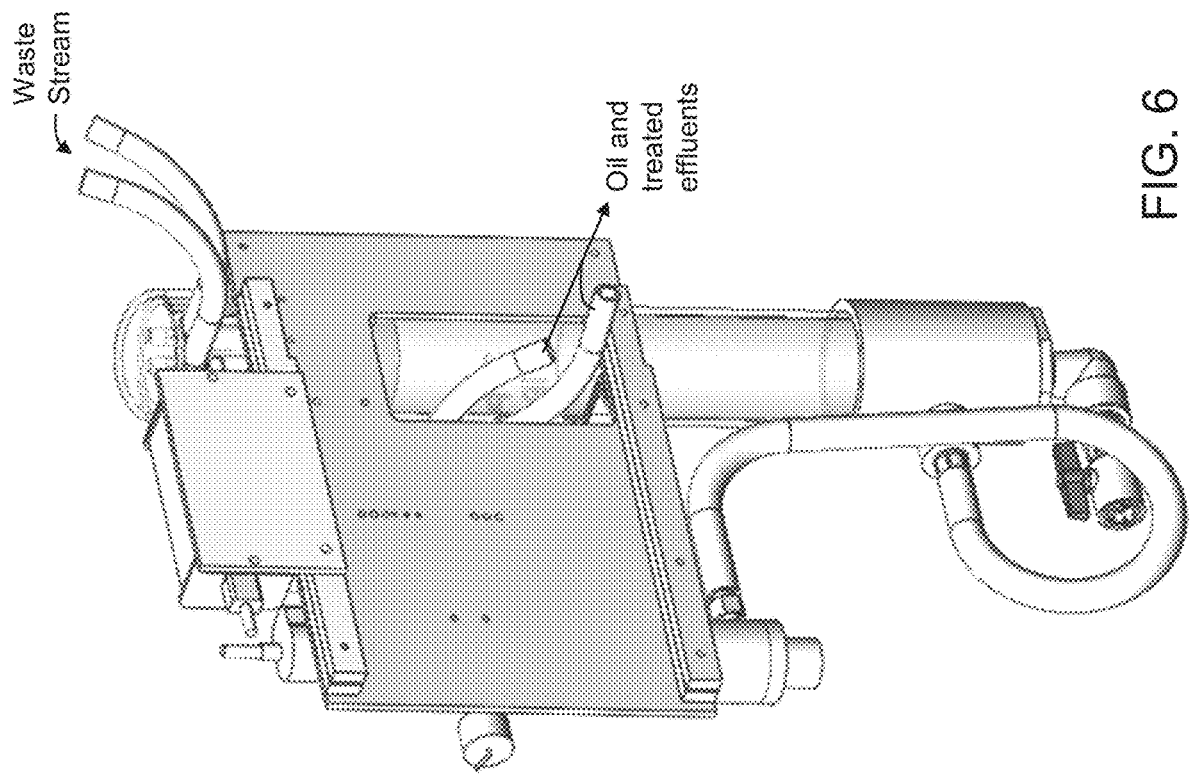
FIG. 6 shows a back view of the treatment system.

In additional embodiments, the system (200) described herein may further comprises a drain valve (203), disposed at the base of the homogenizing reservoir (201). As shown in FIG. 4, the drain valve may be used effectively purge or drain the system, for example, during maintenance.

Figure 5:
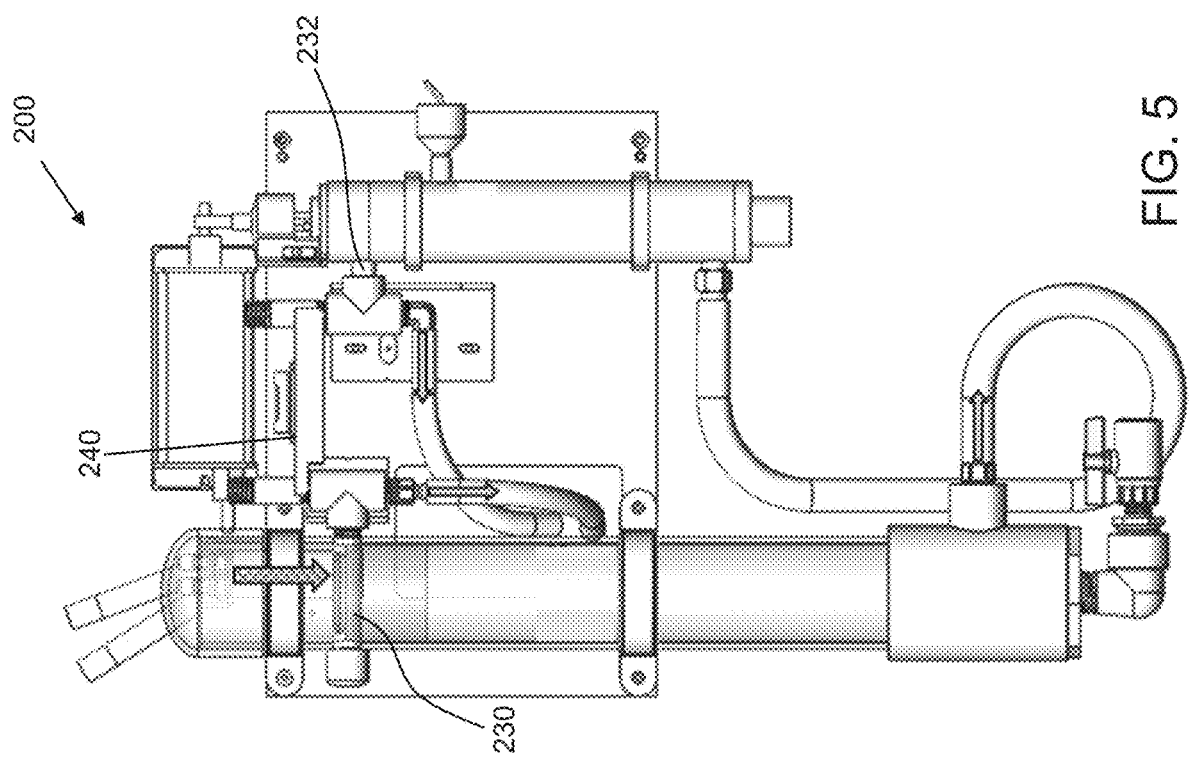
FIG. 5 shows a front view of the treatment system with an oil weir, a water weir, a relative height checking tool, and an adjusting weir bracket.

Referring to FIG. 5, in further embodiments, any one of the systems (200) may have an oil weir (230) disposed in the homogenizing reservoir (201) and a water weir (232) disposed in the radical generating reservoir (204). The systems (200) may also have a relative height checking tool (240) for leveling and maintaining the position of the oil weir (230) relative to the water weir (232).

Consistent with previous embodiments of the present invention, the radical generator (216) may comprise a UV irradiation source. Non-limiting examples of the UV irradiation source include a mercury lamp, gas-discharge/deuterium, metal-halide arc, tungsten-halogen incandescent, a light emitting diode, a laser, a plasma extreme ultraviolet source, or a tunable vacuum UV source. In some embodiments, the UV irradiation source may have a power range of 1 W or greater. For example, the power range may be at least about 5 W, or at least 10 W, or at least 20 W, or at least 30 W, or at least 40 W, or at least 50 W. In some embodiments, the UV irradiation source may be about 10 W, 18 W, or 50 W.

In other embodiments, the radical generator (216) may comprise one or more UV irradiation sources. In some embodiments, the UV irradiation sources may be installed adjacently with a parallel or serial connection to each other, such as a UV light array. For example, the radical generator (216) may comprise 2-4 UV irradiation sources connected in parallel or in series.

Figure 7:
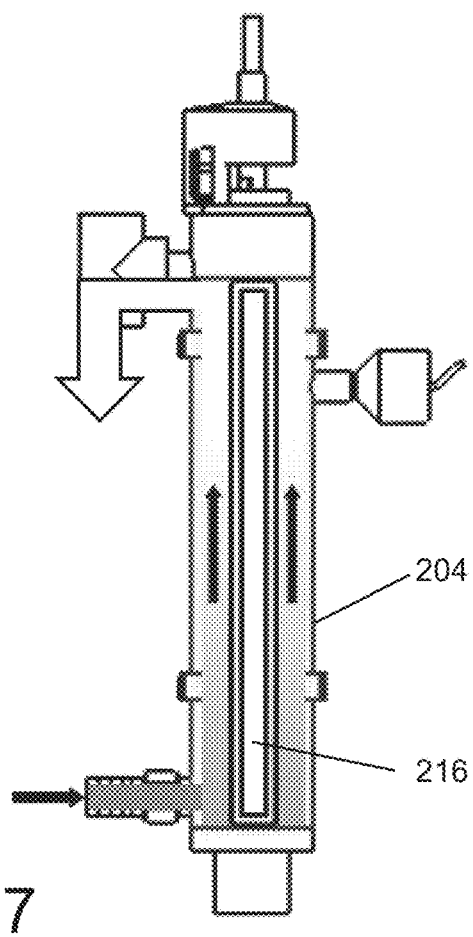
FIG. 7 shows a cross-sectional view of a flow-through in-line radical generator of the treatment system used for UV irradiation.
Figure 8:
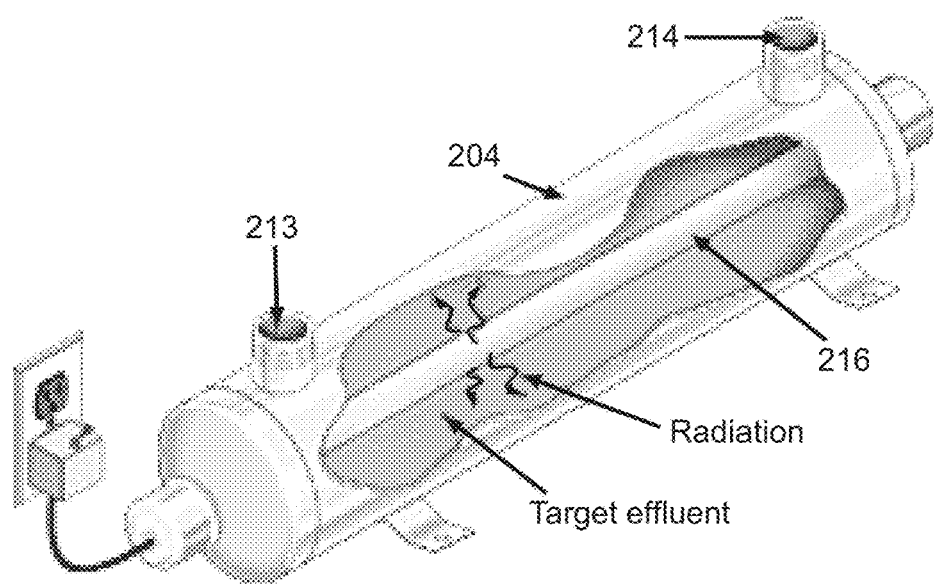
FIG. 8 shows another view of the flow-through in-line radical generator.

Referring to FIGS. 7 and 8, in some embodiments, the radical generator (216) may be disposed inside the radical generating reservoir (204) so as to form an in-line flow-through UV irradiation system wherein the target effluent is contacting the radical generator (216). In some embodiments, the radical generator may also comprise a protective tubing, such as a quartz tube, that encloses the UV irradiation source. In this in-line flow-through UV irradiation system, the target effluent is actively mixed or dwell mixed while in the radical generating reservoir (204). Alternatively, the target effluent may not be mixed while in the radical generating reservoir (204).

Figure 9A:
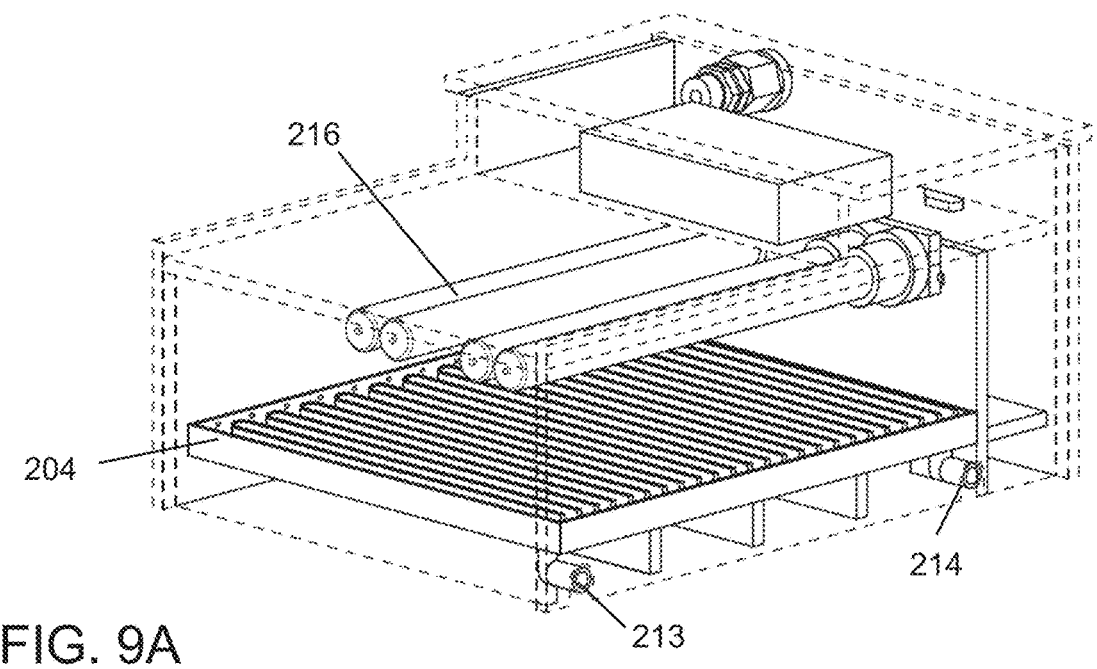
FIG. 9A shows a perspective view of another embodiment of the radical generator being a top-down radical generator used for fluid contact-free UV irradiation by UV lamps.
Figure 9B:
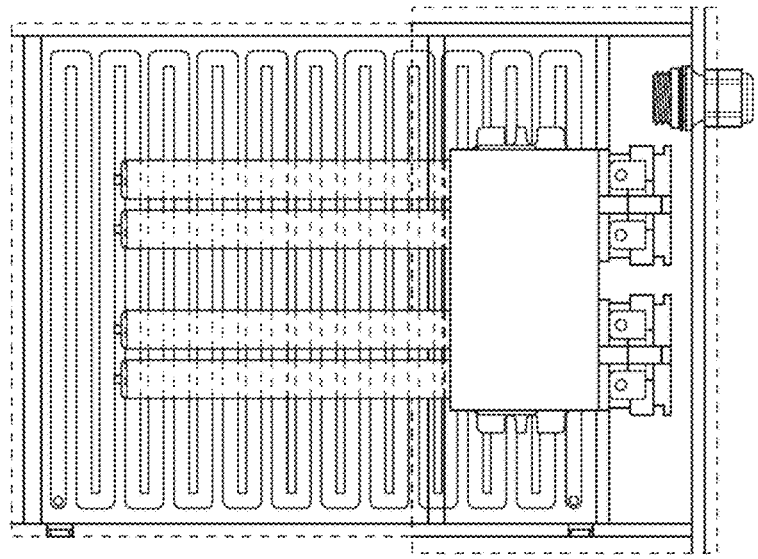
FIG. 9B shows a side view of another embodiment of the radical generator being a top-down radical generator used for fluid contact-free UV irradiation by UV lamps.
Figure 9C:
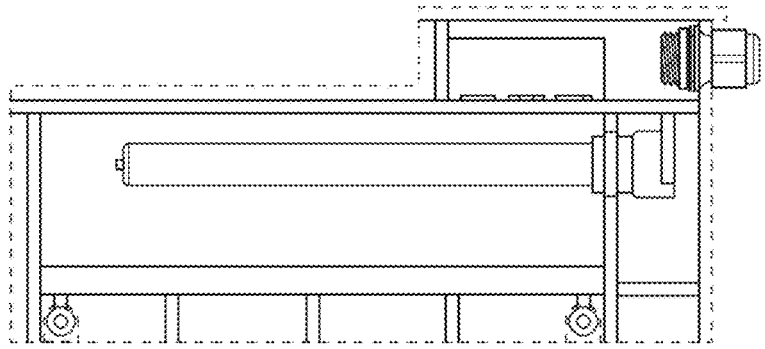
FIG. 9C shows a side view of another embodiment of the radical generator being a top-down radical generator used for fluid contact-free UV irradiation by UV lamps.
Figure 10:
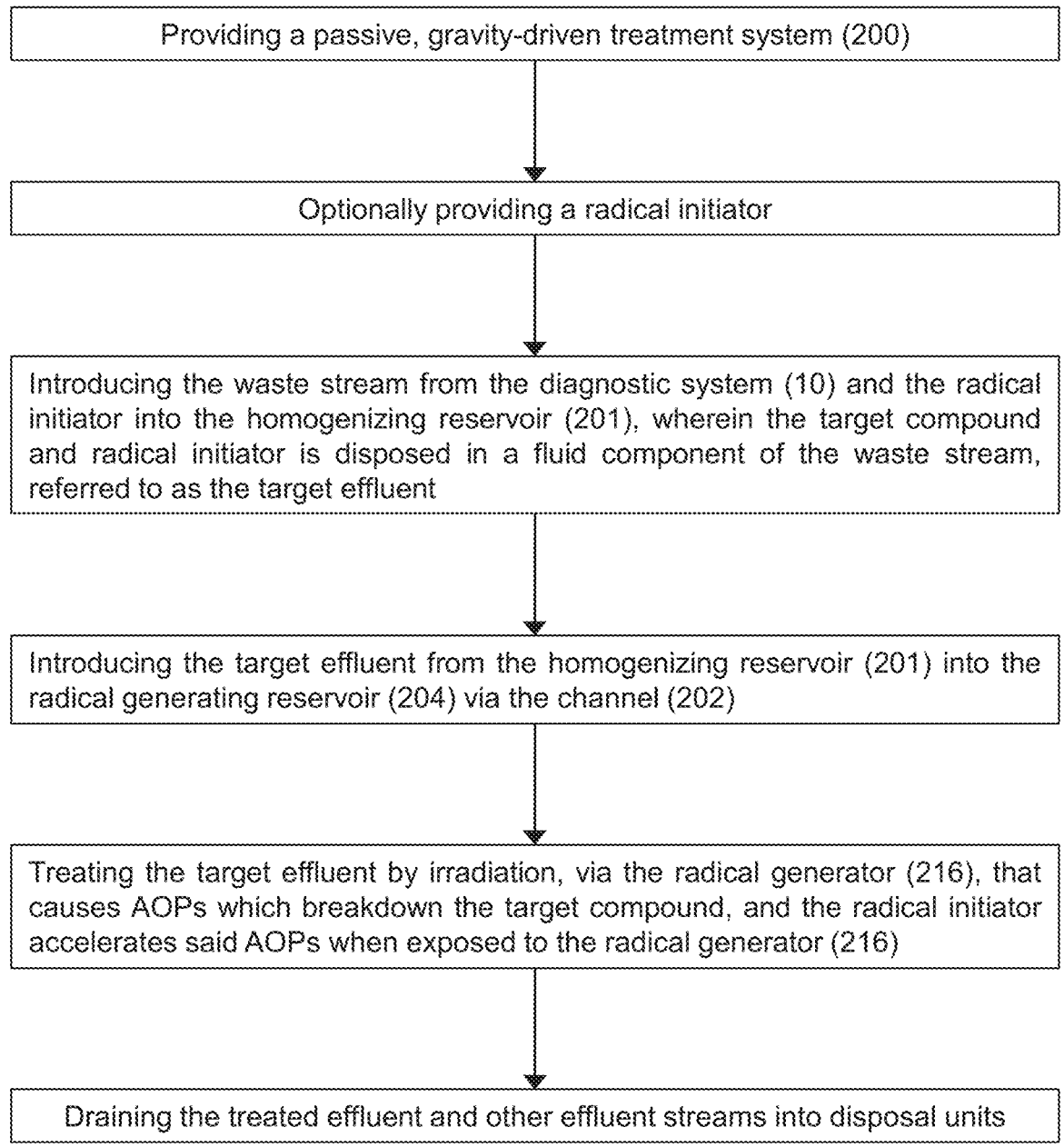
FIG. 10 shows an embodiment of a method of the present invention.

Referring to FIGS. 9A-9C, in alternate embodiments, the radical generator (216) is positioned at a distance from and above the radical generating reservoir (204) so as to form a top-down UV irradiation system, where irradiation of the target effluent is performed without directly contacting the radical generator (216).

Consistent with previous embodiments, a feedback mechanism may be operatively coupled to the radical generator (216) to ensure the amount of UV light irradiating the effluent is above a predetermined threshold. In one embodiment, the feedback mechanism may comprise a UV sensor (210) for measuring the amount of UV light irradiating the target effluent.

Figure 25:
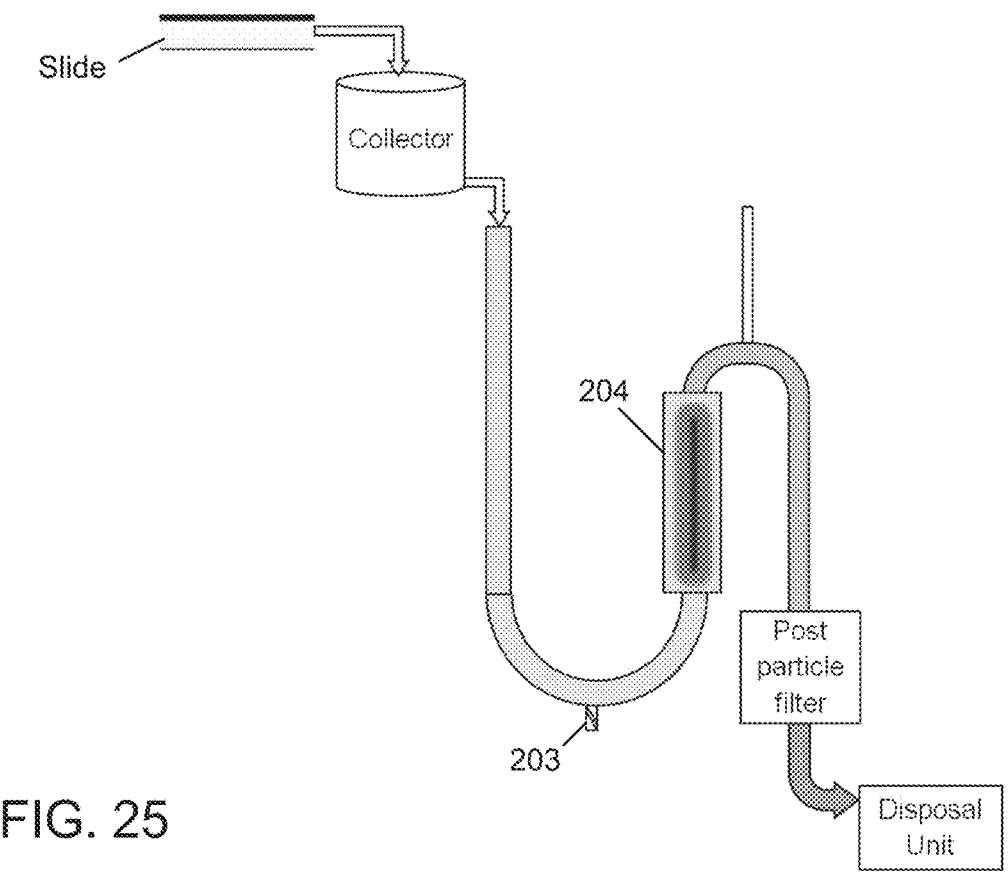
FIG. 25 shows an alternative non-limiting embodiment of the treatment system of the present invention. A post particle filter may be optionally included the treatment system, or removed from the system (not shown).
Figure 26A:
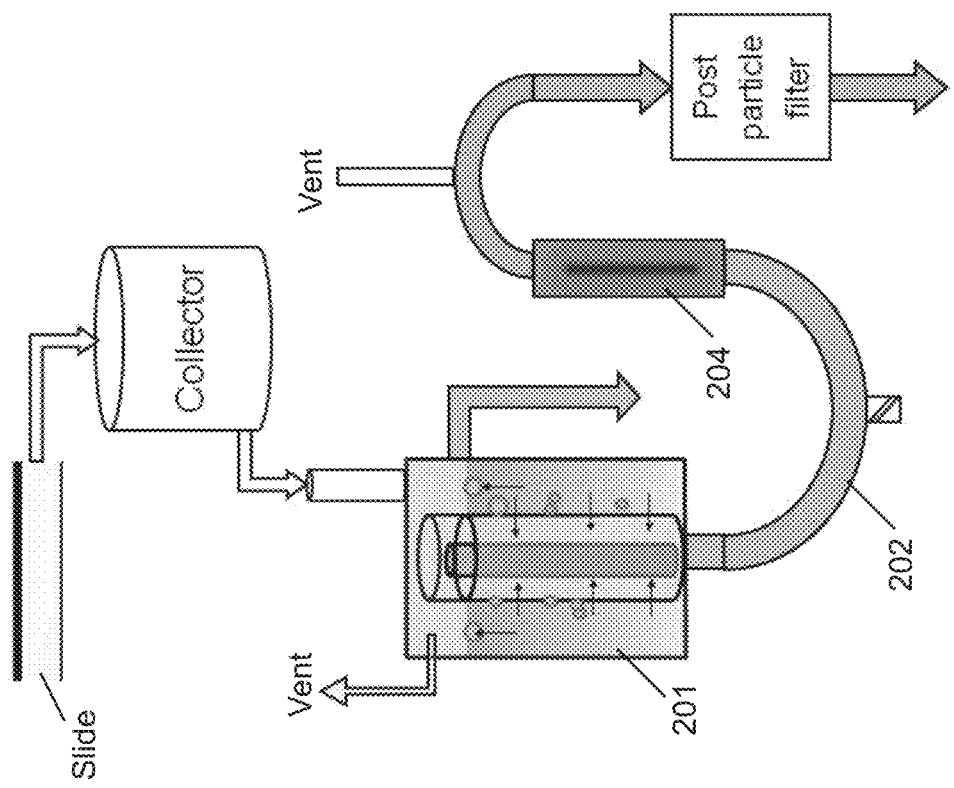
FIG. 26A shows an alternative non-limiting embodiments of the treatment system employing buoyancy-only separation and combined buoyancy and hydrophilic/coalescing filtration separation, respectively. The post particle filter may be optionally included the treatment system, or removed from the system (not shown).

In some embodiments, as shown in FIGS. 25 and 26A, a particle filter may be optionally connected to the waste outlet (214) of the radical generating reservoir. The particle filter (115) may be effective for collecting precipitants, such as polymer particles, formed as a result of treatment of the target effluent. In other embodiments, the system (200) may have a vent for ease of priming control of the flow rates of the streams. For example, the homogenizing reservoir (201) and/or the radical generating reservoir (204) may have a venting means.

Figure 26B:
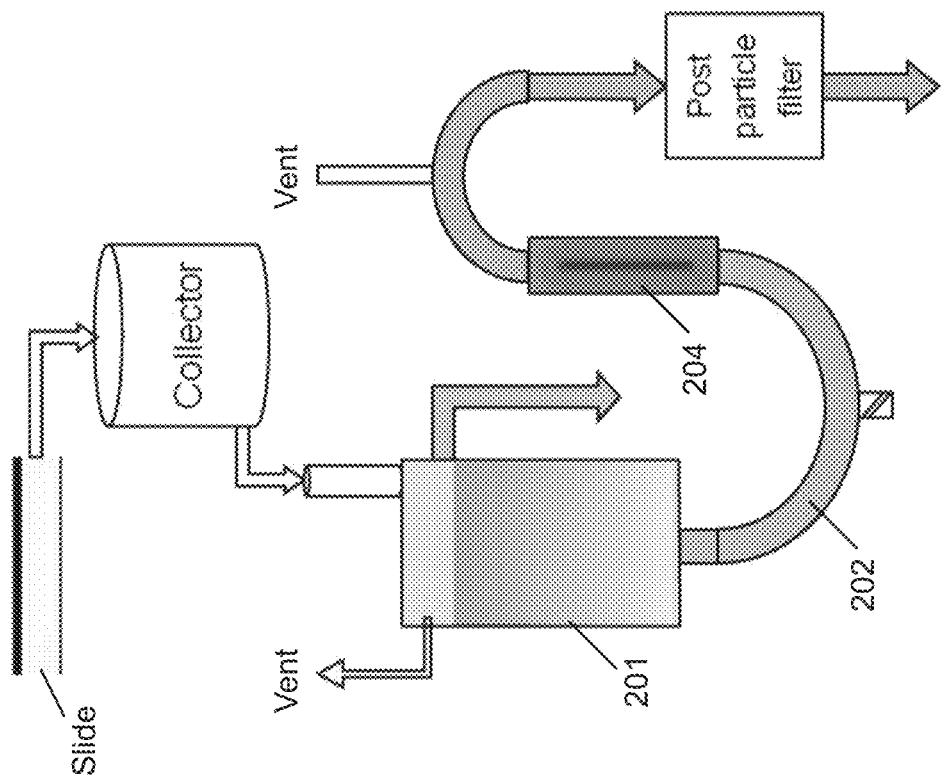
FIG. 26B shows an additional alternative non-limiting embodiments of the treatment system employing buoyancy-only separation and combined buoyancy and hydrophilic/coalescing filtration separation, respectively. The post particle filter may be optionally included the treatment system, or removed from the system (not shown).
Figure 27A:
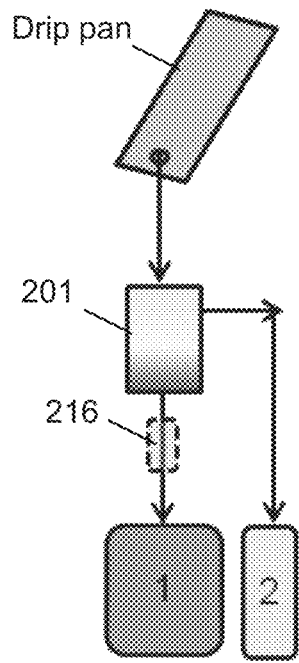
FIG. 27A shows alternative non-limiting embodiment of the treatment system.
Figure 27B:
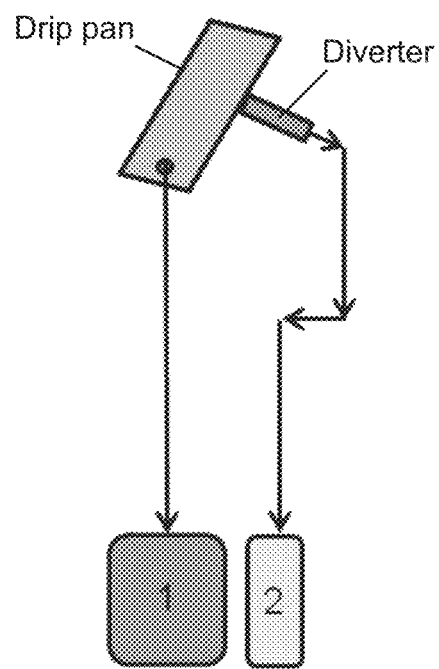
FIG. 27B shows an additional alternative non-limiting embodiment of the treatment system.
Figure 27C:
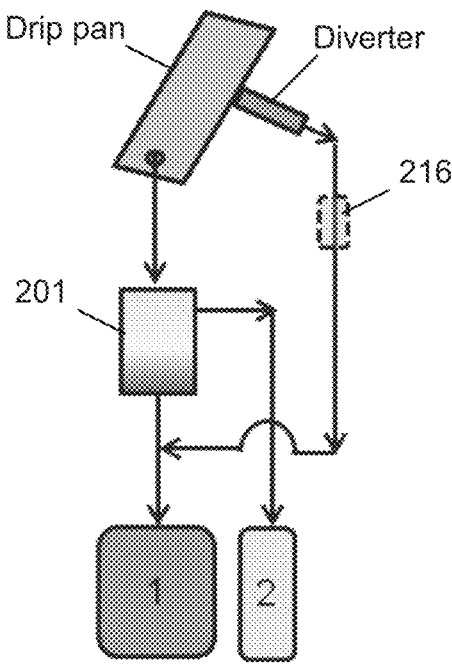
FIG. 27C shows an additional alternative non-limiting embodiment of the treatment system.

In further embodiments, as shown in FIG. 26B, the homogenizing reservoir (201) may optionally have a filter disposed therein for coalescing the non-aqueous fluid component or oil component. The filter may be chosen such that a filter porosity allows the aqueous component to flow through the filter while preventing the oil component from doing so. For example, the filter may be a hydrophobic coalescence filter. The filter may also effectively control a flow rate flow rate of the aqueous component into the channel (202).

EXAMPLES

The following are non-limiting examples of the present invention. It is to be understood that said examples are provided for the purpose of demonstrating the present invention in practice, and is in no way intended to limit the invention. Equivalents or substitutes are within the scope of the invention.

System Dimensions

Embodiment 1

Liquid cover slip (LCS) has a specific gravity of 0.8. For a $\Delta h=0.5$ inches, then $h_0$, which is the height of the oil layer, is calculated using the formula, $$\Delta h = h_0 \left[1 - \frac{\rho_0}{\rho_w}\right],$$

to be $h_0=2.5$ inches, or 63.5 mm.

Embodiment 2

Referring to FIG. 2, the homogenizing reservoir (201) may be a cylindrical column having a 4,400 mm² internal, cross-sectional surface area and height ranging from about 600 mm to 1000 mm. The radical generating reservoir (204) may be a cylindrical column having a tubular UV bulb co-axially disposed therein. Excluding the cross-sectional surface area of the tubular UV bulb, the remaining internal, cross-sectional surface area of the radical generating reservoir (204) is about 2,330 mm². A height of the radical generating reservoir (204) is at least 300 mm, of which 270 mm is the travel length. Given a $\Delta h=0.5$ inches, then $h_0$ of the oil layer is about 63.5 mm. The channel (202) has a cross-sectional surface area of about 283 mm² and a capacity of about 0.15 L.

The waste stream enters the cylindrical column at an average flow rate of about 50 ml/min. A height of the aqueous layer is about 500 mm and the downward velocity of the aqueous layer is about 10 mm/min. Thus, the travel time of the aqueous layer down the column is about 50 minutes, which provides a sufficient residence time to ensure that the aqueous fluid components are evenly mixed, at least at the fluid outlet of the column, to form the target effluent. The target effluent flows through the channel (202) in about 1.5 minutes. The target effluent then flows through the radical generating reservoir (204) at an upward velocity of about 21 mm/min, thus the travel time of the target effluent through the radical generating reservoir (204) for irradiation is about 12.8 minutes. The combined fluid volume in the column, channel, and radical generating reservoir (204) is about 3 L.

Embodiment 3

Given the same system and dimensions as in Embodiment 2, the waste stream enters the cylindrical column at an average flow rate of about 23 ml/min. A height of the aqueous layer is about 500 mm and the downward velocity of the aqueous layer is about 5 mm/min. Thus, the travel time of the aqueous layer down the column is about 100 minutes, which provides a sufficient residence time to ensure that the aqueous fluid components are evenly mixed, at least at the fluid outlet of the column, to form the target effluent. The target effluent flows through the channel (202) in about 3 minutes. The target effluent then flows through the radical generating reservoir (204) at an upward velocity of about 10 mm/min, thus the travel time of the target effluent through the radical generating reservoir (204) for irradiation is about 27 minutes. The combined fluid volume in the column, channel, and radical generating reservoir (204) is about 3 L.

The present invention is not limited to the aforementioned system dimensions, fluid velocities, and residence times. In some embodiments, said dimensions may be tailored to a specific automated system.

Experimental

Investigations were performed to examine various levers that could impact AOP activity in BenchMark ISH/ISH automated instrument waste to destroy DAB. These levers were tested in DDI water, Reaction Buffer and in Bench-Mark DAB IHC waste matrices. These levers were tested in a flow-through UV light source test bed device (i.e. in-line UV water sterilizers), a top-down non-contact irradiation source (tRED test bed), and a tRED test bed which combined water/oil separation and DAB aqueous waste UV irradiation.

Oil Separation Principles

Experimental data was obtained using BenchMark Ultra instrument as the slide stainer. Typical liquid cover slip (LCS) to aqueous ratios on the BenchMark Ultra instrument are approximately 20/80%, with the LCS (oil) being used for the high temperature steps typically to mitigate evaporative losses. Due to random access processing, LCS can be present at any time in the combined waste stream. Two separation principles are invoked for separation of LCS from aqueous waste: buoyancy (FIG. 2) and optional filtration/coalescence (FIG. 26B). Both are based on gravity driven flow only and do not require any pumping.

The primary separation principle is based on buoyancy in a standing tube/chamber. Typical LCS (Oil) density is 0.79-0.81 g/cm$^3$ and therefore LCS floats to the top of the surface of the aqueous layer over time, particularly in low flow scenarios. For buoyancy separation to work properly, a fully charged system is required. Typically, this would be accomplished by filling the whole system with aqueous fluid up to a level line. In case of a partially filled system, LCS discharged from the drip-pan could be funneled into the aqueous path and partially coat the UVC lamp, which forms a degrading layer over time. Thus, a height adjustment may be necessary between the oil separation layer and aqueous separation layer. This adjustment is needed to allow proper layer separation between LCS and aqueous to occur in the homogenizing chamber and to account for differences in density (LCS≈0.8 vs. aqueous≈1).

The secondary separation principle is based on a hydrophilic filter, such as a nylon wound filter with 5/10/15 micron pore size, Universal Filter Italiana, product number ("p/n") UN5R5P, UN10R5P, UN15R5P) rejecting oil (e.g. LCS) while letting aqueous media pass through. The hydrophilic filter works as a coalescing media, allowing smaller oil droplets to be absorbed by the fibers of the filter and aggregate into larger droplets. Open media porosity (5 microns) and hydrophilicity allows for water to pass through the filter (radially from outside to inside) and for oil to remain in the radial fluid sleeve outside of the filter.

Due to the hydrophilic/coalescing filter being constructed of wound nylon, the surface area of the filter (~100 cm$^2$) is rather large, and due to low flow rates (~50 ml/min) and the multi-layered porosity of the filter media, fouling of the surface by exposure to oil is reduced (demonstrated by 4+ months of equivalent use of same filter media, being exposed to mixtures of LCS and aqueous).

High Performance Liquid Chromatography ("HPLC") Analytical Methods

DAB degradation rates were determined using HPLC analysis to monitor DAB concentration change in Milli-Q® deionized ("DDI") water, BenchMark Reaction Buffer and BenchMark IHC waste matrices. HPLC analyses were performed on a Waters Acquity Ultra Performance Liquid Chromatography ("UPLC") instrument with photodiode array ("PDA") detection. Standard reverse phase chromatography was used for UPLC analyses in BenchMark Reaction Buffer and DDI water matrices. Reverse phase HPLC chromatography with ion-pairing was used for DAB analysis in BenchMark waste. DAB samples were analyzed without filtration or dilution.

A. Reverse Phase UPLC Analytical Method

Figure 11A:
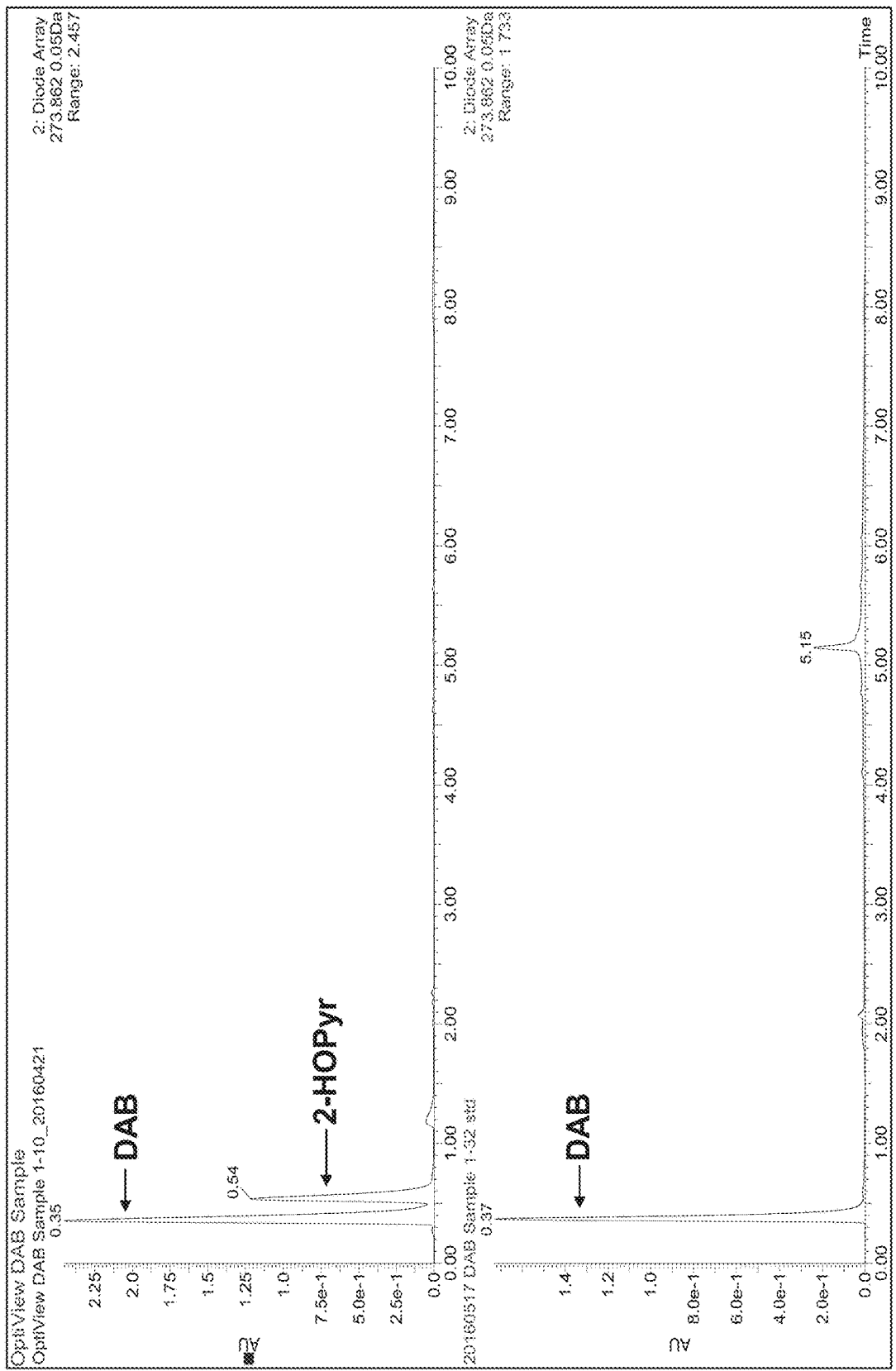
FIG. 11A shows a representative HPLC spectra of representative DAB standards using reverse phase UPLC (274 nanometers (nm)).
Figure 11B:
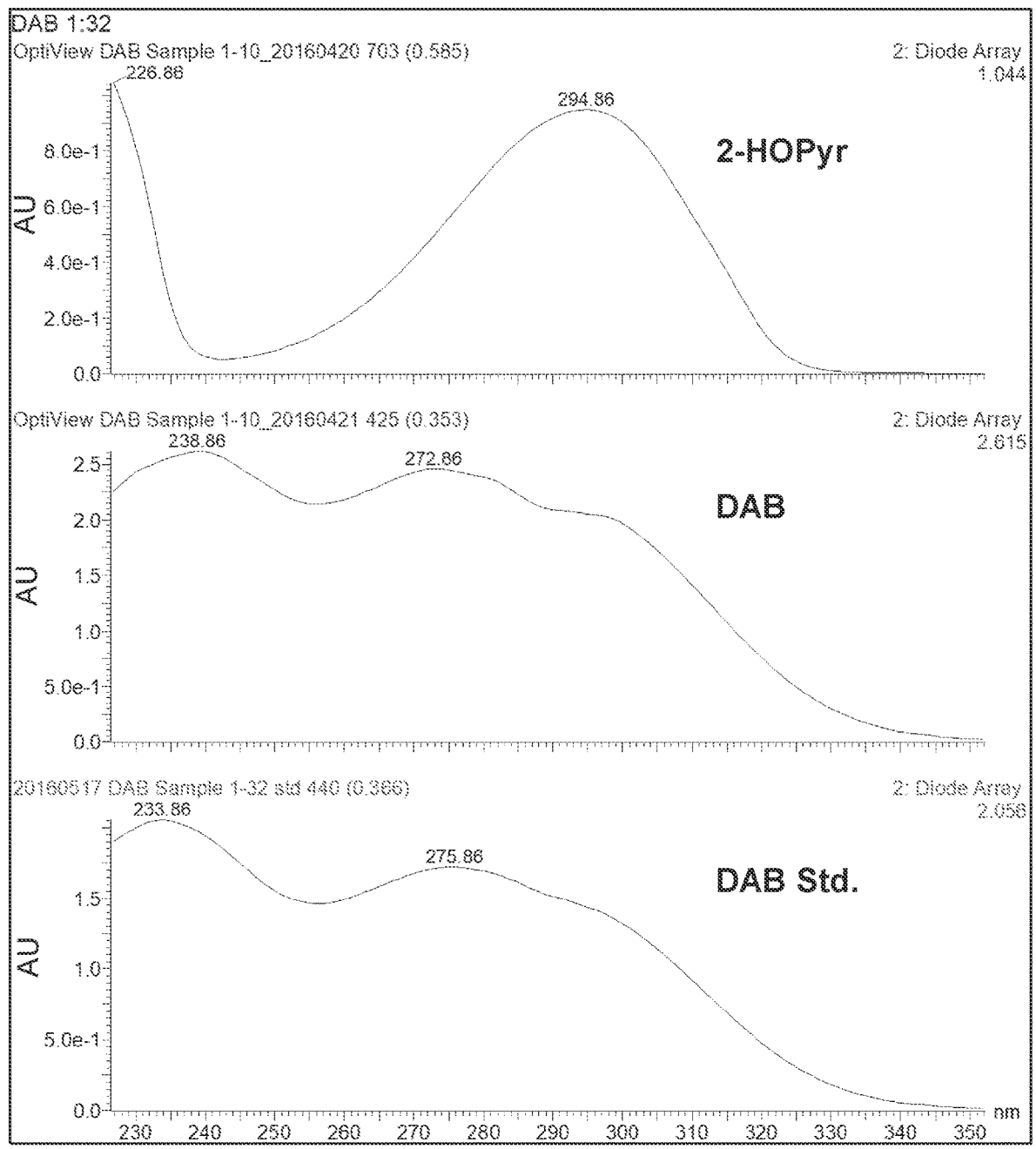
FIG. 11B shows a representative UV-VIS spectra of representative DAB standards using reverse phase UPLC (274 nanometers (nm)).
Figure 11C:
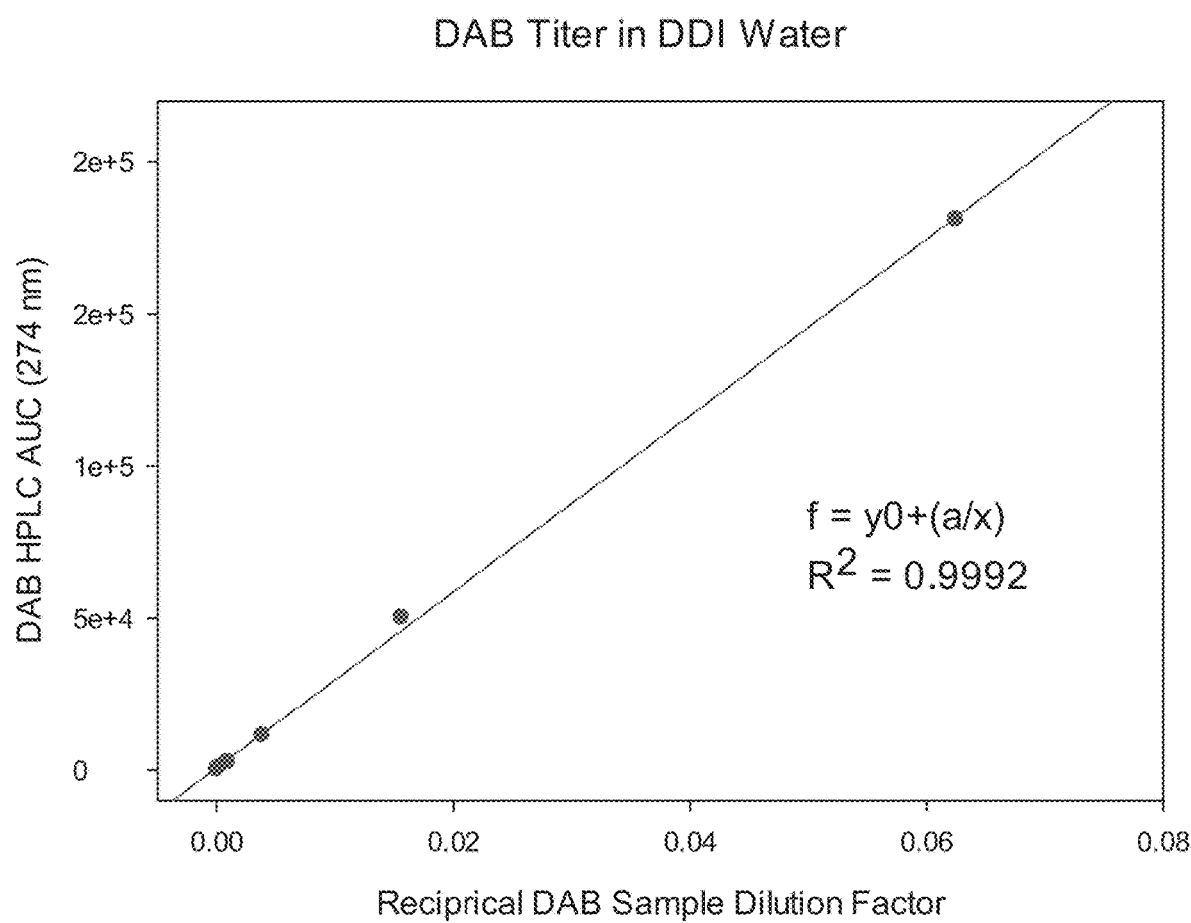
FIG. 11C shows that DAB HPLC analysis in DDI water was relatively linear from 136 µg/mL to 133 µg/L.

A Waters ACQUITY UPLC Bridged Ethylene Hybrid ("BEH") C18 Column 1×50 mm (1.7μ) UPLC column was used. The eluents were A: 0.1% formic acid in liquid chromatography mass spectrometry ("LCMS") water, and B: 0.1% formic acid in acetonitrile. The flow rate was 0.2 mL/min, the column temperature was 40° C., and the injection volume was 8 L. PDA detection wavelengths were 210 to 499 nm (2.4 nm resolution and 20 points/sec). The expected retention time of DAB and 2-Hydroxypyridine (2-HOPyr) was 0.35 min and 0.54 min, respectively. Representative HPLC spectra (274 nm are shown in FIGS. 11A-11C. The gradient profile is shown in Table 1.

TABLE 1

| Gradient Profile | | |
|---|---|---|
| Time (min) | % A | % B |
| 0 | 99 | 1 |
| 1 | 99 | 1 |
| 6 | 20 | 80 |
| 7 | 20 | 80 |
| 8 | 99 | 1 |
| 10 | 99 | 1 |

B. Reverse Phase HPLC with Ion-Pairing

Figure 12A:
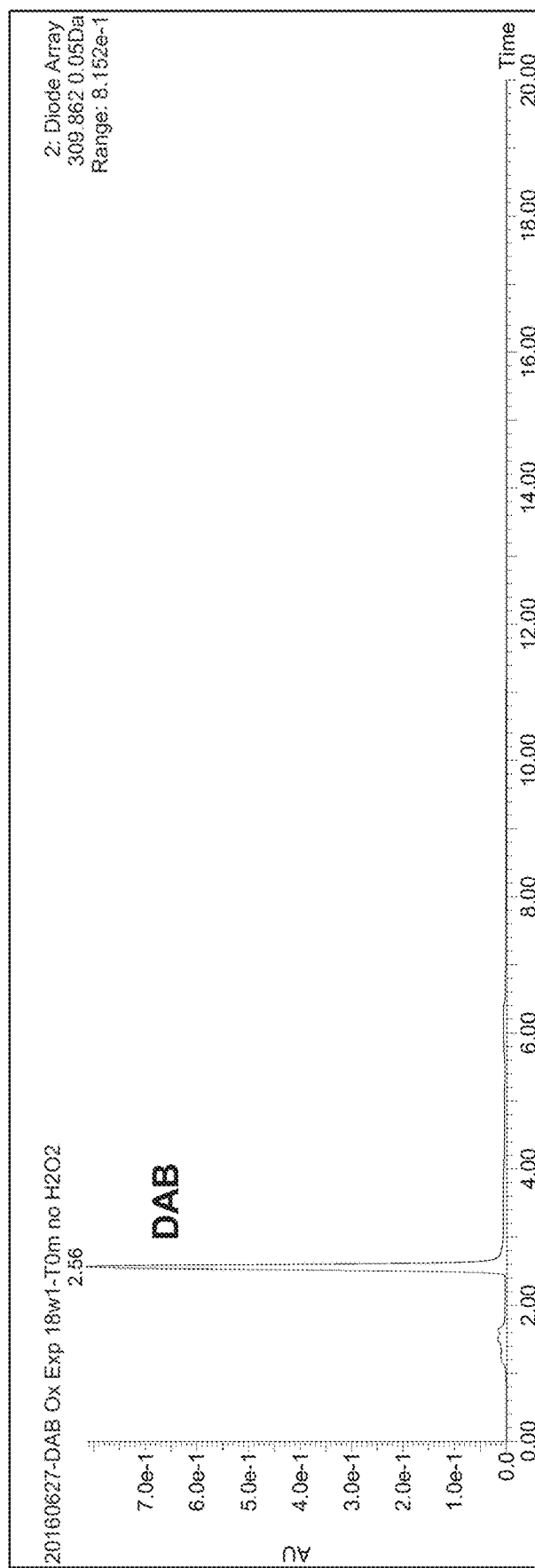
FIG. 12A shows representative HPLC spectra of a representative DAB standard using reverse phase HPLC with ion-pairing (310 nm).
Figure 12B:
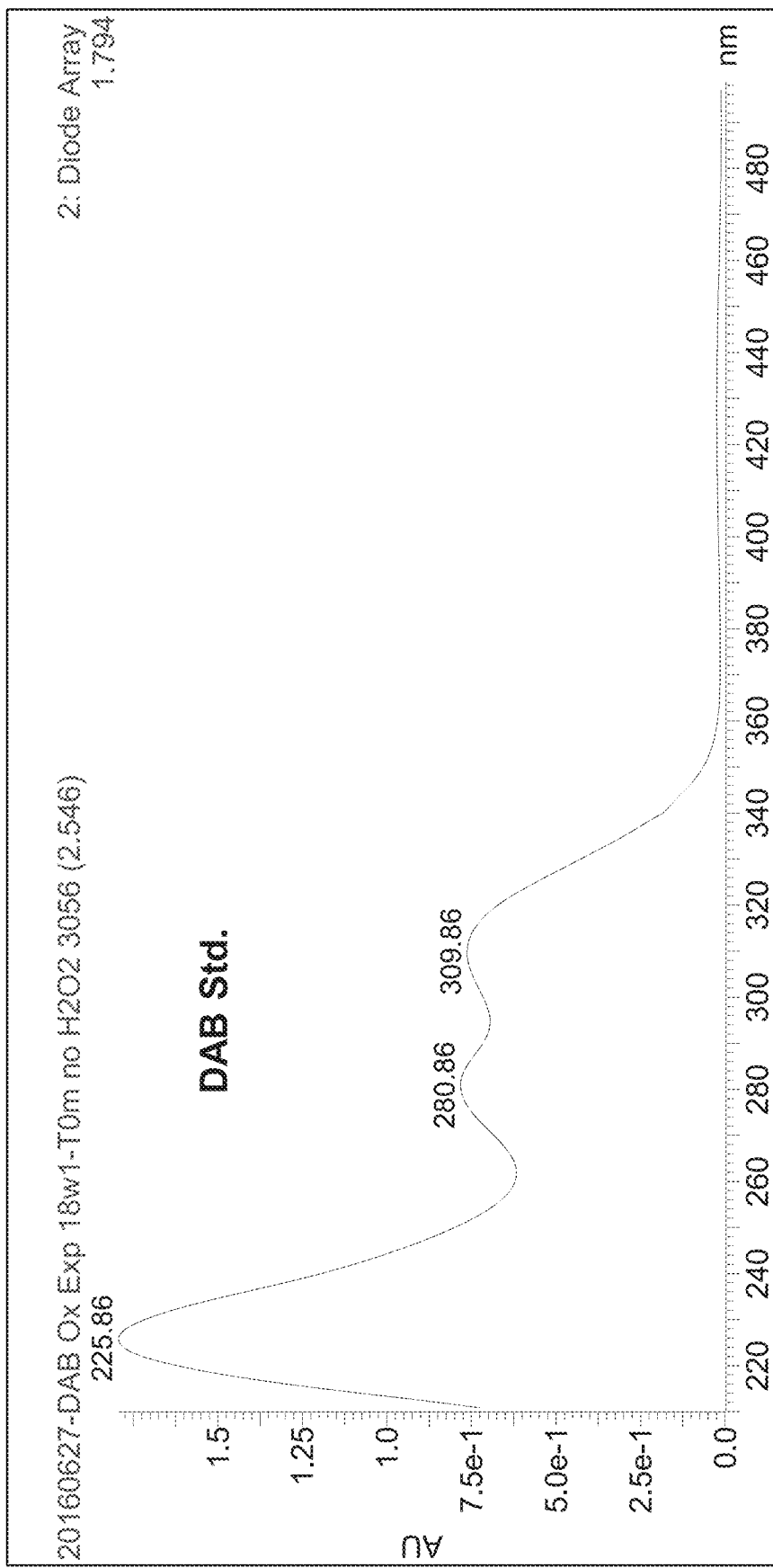
FIG. 12B shows UV-VIS spectra of a representative DAB standard using reverse phase HPLC with ion-pairing (310 nm).
Figure 12C:
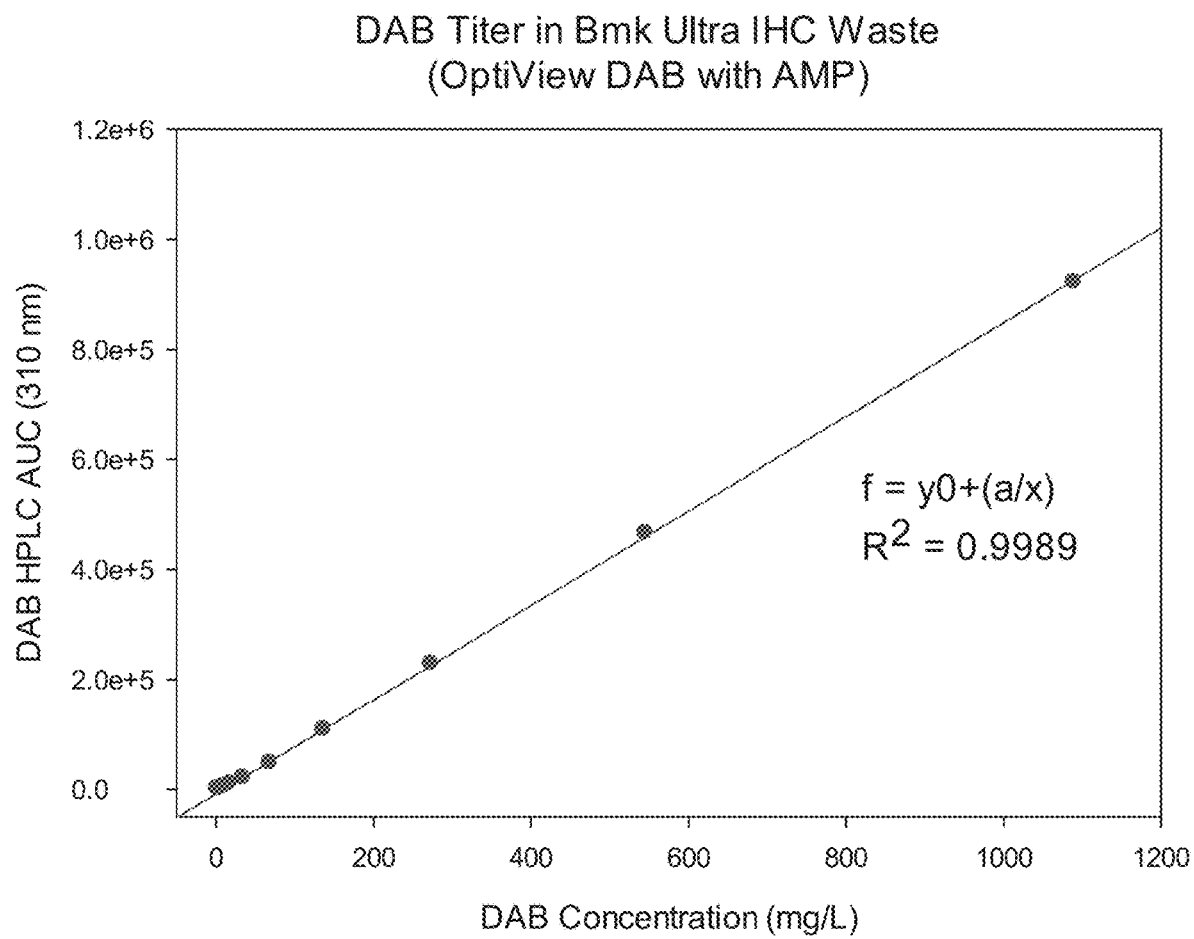
FIG. 12C shows that DAB HPLC analysis in BenchMark waste was relatively linear from 109 mg/mL to 4.26 mg/L for reverse phase HPLC with ion-pairing.

A SIELC PrimeSep S column 2.1×100 mm (5μ) and 2.1×10 mm guard column HPLC column was used. The eluents were 40% acetonitrile in 50 mM ammonium formate (pH=4.0). The flow rate was 0.2 mL/min, the gradient profile was an isocratic elution, the column temperature was 30° C., and the injection volume was 8 μL. The PDA detection wavelengths were 210 to 499 nm (2.4 nm resolution and 20 pts/sec). The expected retention time (in BenchMark waste) for DAB and 2-HOPyr was 2.56 min and 1.64 min, respectively. Representative HPLC spectra (310 nm) are displayed in FIGS. 12A-12C.

UV Irradiated Test Beds

A. Flow-Through UV Irradiation Test Beds

Multiple UV irradiation flow-through systems were used to examine UV promoted DAB oxidation. A commercial in-line UV water sterilizers with preset lamp wattage and UV irradiation chamber geometry, namely, an Aquatop 10 W In-line UV sterilizer (Aquatop p/n: IL10-UV), was used to treat water up to a 211 gallon/hour flow rate. The sterilizer featured an external variable-speed micropump gear pump that controlled fluid flow rates with the assistance of an independent power supply. Samples were irradiated with active mixing, dwell mixing, or no mixing. For in-line UV sterilizers that were used without mixing pumps, inversion mixing was performed to create a uniform sample prior to sampling. Multiple UV sterilizer UV lamp wattages were examined (10, 18 and 55 W). Multiple UV irradiation sources may be installed adjacently with serial connection to each other to increase effluent exposure time.

B. Top-Down UV Irradiation Test Beds

As shown in FIGS. 9A-9C, a test bed was prepared to investigate top-down UV irradiation systems without direct liquid contact to the UV irradiation source (also referred to as "UV lamp light"). This test bed used two 18 W lamps to irradiate the fluid matrix from above while the liquid meandered through a predetermined path in the metal tray below to control sample exposure time. The UV light sources may be installed adjacently in parallel connection to each other (e.g. UV light array, etc.) to increase the power of the array. Alternatively, the UV light sources may be installed serially to increase exposure time. A second bottom irradiation plastic container was prepared without the pathway. UV light is absorbed as it goes through a liquid medium causing the aqueous layer furthest from the lamp to receive less UV irradiation. This test bed was used to examine liquid layer thickness and waste matrix impurities (i.e. LCS, DAB oxidation products, etc.) impact on DAB UV decomposition rates.

C. UV Lamp Characterization

A mercury lamp was used as a primary UV light source for its lower cost and discrete emission wavelengths. Lamps with more continuous emission spectra include xenon arc, deuterium arc, mercury-xenon arc, metal-halide arc and tungsten halogen incandescent lamps. Other UV light sources are available and could provide similar impact such as UV LEDs, UV lasers, etc. The Aquatop 10 W UV lamp source for the in-line UV sterilizer was characterized by reading its emission spectrum by a fluorescence detector. The lamp was wrapped in tin foil that contained a small hole for light emission to the fluorescence detector. A list of relevant UV light wavelengths and their photon energies can be found below in Table 2. UVC light at 253 nm can perform most of the DAB oxidation since it provides higher energy.

TABLE 2

Relevant UV Light Wavelengths and Their Photon Energy.

| UV Light Name | Abbreviation | Wavelength (nm) | Photon energy (eV, aJ) |
|---|---|---|---|
| Ultraviolet A | UVA | 315-400 | 3.10-3.94, 0.497-0.631 |
| Ultraviolet B | UVB | 280-315 | 3.94-4.43, 0.631-0.710 |
| Ultraviolet C | UVC | 100-280 | 4.43-12.4, 0.710-1.987 |

DAB UV Oxidation Experimental Results

A. Sample Mixing Impact

Figure 13A:
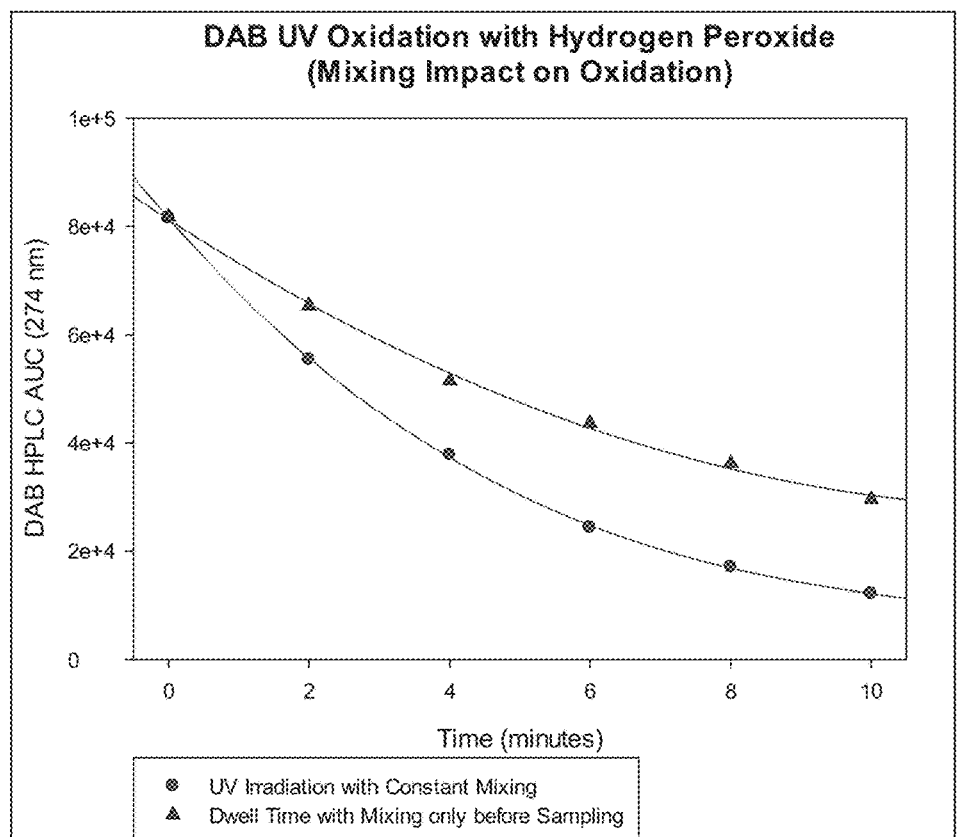
FIG. 13A shows results of mixing impact on DAB UV oxidation with hydrogen peroxide.

Initial DAB UV oxidation experiments were performed in the Aquatop 10 W in-line UV sterilizer (Aquatop p/n: IL10-UV) with variable mechanical mixing using the Micropump unit. A DAB sample in DDI water (68.1 mg/L) was treated with 3% hydrogen peroxide as a radical initiator (1 mL per approx. 225 mL DAB sample). The sample was irradiated by UV light (10 min) either with constant mixing or with quick dwell mixing to create a uniform sample prior to sampling. The reaction mixture was analyzed by UPLC every 2 minutes through 10 minutes. As shown in FIG. 13A, the DAB oxidation rates were accelerated through mechanical mixing. Mixing aided the diffusion of the homolytic hydrogen peroxide UV oxidation product (HO.), which oxidized DAB.

Figure 13B:
FIG. 13B shows UV-oxidized DAB samples from active mechanical mixing after storage overnight at 10° C.
Figure 13C:
FIG. 13C shows UV-oxidized DAB samples from dwell mixing after storage overnight at 10° C.

DAB oxidation continued in DDI water during storage at 10° C. on the UPLC. The DAB monomer was not detected by UPLC analysis in samples after storage overnight even if they only received 2 minutes UV irradiation. Moreover, the AOPs generated by UV light and hydrogen peroxide effectively polymerized DAB from DDI water when the sample was actively mixed during UV irradiation (FIGS. 13B-13C). The active mechanical mixing increased the intermolecular polymerization of the oxidized DAB causing it to form larger polymers, which readily precipitated from solution. The precipitated DAB polymers were not observed for mixed samples on the first day. No precipitation was observed in dwell mixed samples after storage overnight. Complete DAB precipitation would be advantageous, as it would promote conditions where all DAB byproducts could be filtered from the matrix.

DAB UV oxidation rates slowed even further when DAB samples were irradiated in DDI water without any mixing. Approximately 34% of the DAB monomer was detected after 15 minutes of static UV irradiation. This was about the same DAB monomer concentration observed at 10 minutes UV irradiation with dwell mixing. Mechanical dwell mixing was eventually replaced by simple inversion of the in-line UV sterilizer twice to homogenize the liquid prior to sampling. Similar results DAB UV oxidation rates were observed. Data is not shown. Aeration was not well tolerated in BenchMark IHC waste matrices. The BenchMark IHC waste surfactants caused the DAB sample to bubble/foam when aerated complicating DAB degradation.

B. Hydrogen Peroxide Impact

DAB UV oxidation experiments were performed in the Aquatop 10 W in-line UV sterilizer as above with variable hydrogen peroxide radical initiator concentrations. A DAB sample in DDI water (68.1 mg/L) was irradiated with or without the presence of 3% hydrogen peroxide (1 mL per approx. 225 mL DAB sample). The sample was irradiated by UV light (60 to 90 min). The Aquatop in-line sterilizer was inverted (2×) using an air pocket to mix the matrix uniformly prior to sampling. The reaction mixture was analyzed by UPLC every 10 minutes.

Figure 14A:
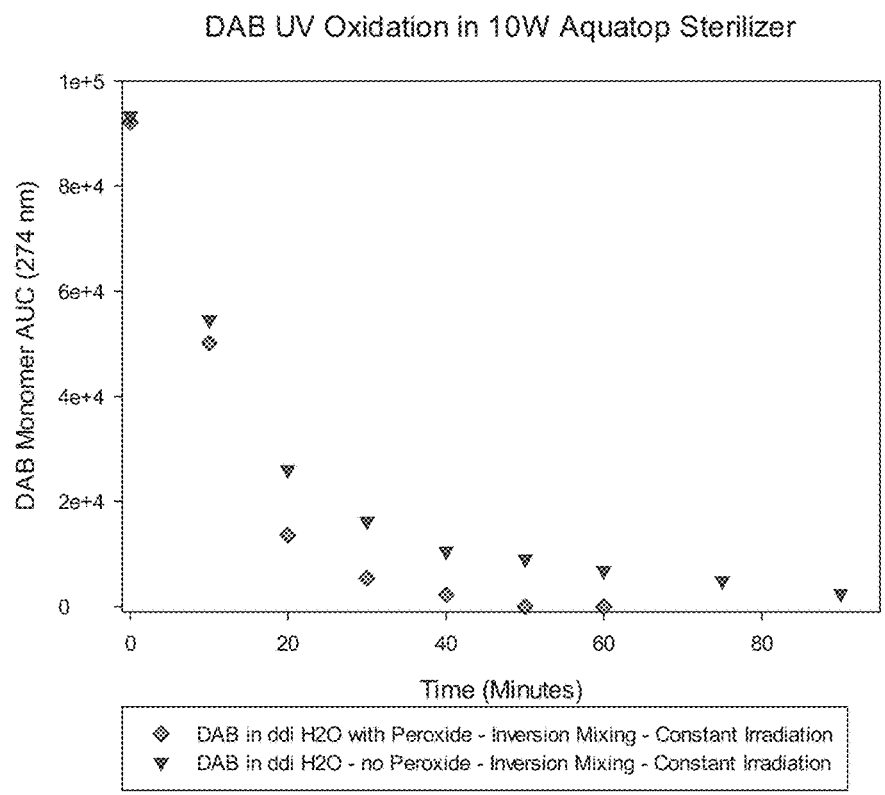
FIG. 14A shows UV oxidation rates of DAB in ddi water with or without a radical initiator (hydrogen peroxide).
Figure 14B:
FIG. 14B shows UV-oxidized DAB samples, taken at varying times of irradiation, after storage overnight at 10° C. with peroxide.
Figure 14C:
FIG. 14C shows UV-oxidized DAB samples, taken at varying times of irradiation, after storage overnight at 10° C. without peroxide.

The UV irradiation effectively promoted DAB oxidation in absence of hydrogen peroxide radical initiator; however, the DAB oxidation rate was accelerated by the additional hydrogen peroxide (FIG. 14A). The DAB UV oxidation reaction approached the HPLC analysis LOD sooner. No DAB monomer was detected after 50 minutes of UV irradiation in the presence of hydrogen peroxide. Approximately 10% of the DAB monomer was still detectable after 60 minutes UV irradiation in absence of hydrogen peroxide. The DAB decomposition still continued in DDI water during storage at 10° C. on the UPLC even in the absence of hydrogen peroxide. No DAB monomer was detected by UPLC analysis in samples that were stored overnight even after only 2 minutes of UV irradiation independent of hydrogen peroxide radical initiator. The AOPs generated by UV light and hydrogen peroxide effectively polymerized DAB from DDI water when the sample treated with UV irradiation for 30 minutes or longer (FIGS. 14B-14C). This time was significantly longer than the 6 minute period that occurred with active mixing (FIGS. 13B-13C). No DAB polymer precipitates were observed after storage overnight in absence of hydrogen peroxide.

C. DAB Sample Matrix Impact

DAB UV oxidation experiments were performed in the Aquatop 10 W in-line UV sterilizer as above with variable sample matrices (i.e. DDI water versus BenchMark IHC Waste). A DAB sample in the matrix (68.1 mg/L DAB in DDI water and 136.2 mg/L in BenchMark IHC Waste) was irradiated without the presence of 3% hydrogen peroxide. A fresh BenchMark Ultra OptiView DAB with TSA Amp IHC Waste was used for this experiment where the aqueous layer was separated from a majority of the LCS by gravity. The BenchMark IHC Waste still contained some LCS, which was finely dispersed with the BenchMark IHC waste surfactants. Both samples were irradiated by UV light for 75 minutes. The Aquatop in-line sterilizer was inverted (2×) using an air pocket to mix the matrix uniformly prior to sampling. The reaction mixture was analyzed by UPLC every 10 minutes.

Figure 15:
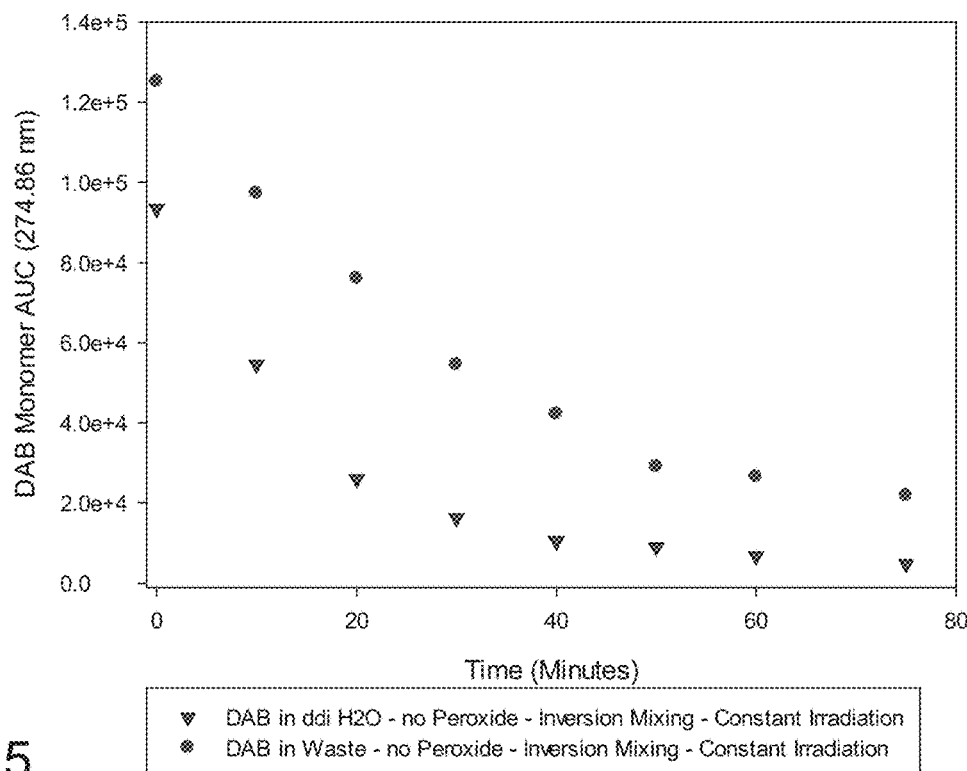
FIG. 15 shows UV oxidation rates of DAB in DDI water and BenchMark IHC waste without hydrogen peroxide.

UV irradiation effectively induced DAB oxidation both matrices; however, the DAB oxidation rate was slower in BenchMark IHC Waste (FIG. 15). Approximately 10% of the DAB monomer was still detectable after 60 minutes UV irradiation in DDI water while about 21% DAB monomer was still detectable 60 minutes UV irradiation in BenchMark waste. The DAB UV oxidation rate in water was slower in BenchMark waste presumably because the waste matrix absorbed more UV light than DDI water.

Figure 16:
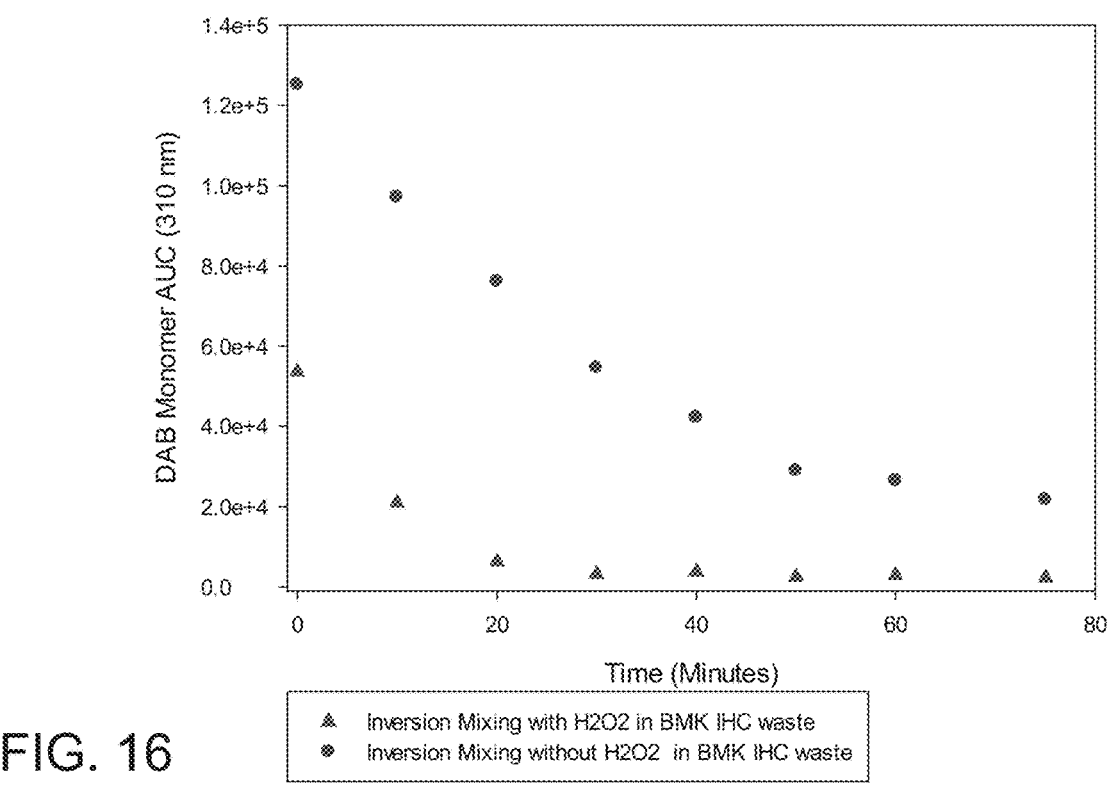
FIG. 16 shows UV oxidation rates of DAB in BenchMark IHC waste with or without hydrogen peroxide.

A DAB sample in BenchMark Ultra OptiView DAB with TSA Amp IHC Waste (136.2 mg/L) was irradiated with or without the presence of 3% hydrogen peroxide. The DAB UV oxidation rate in BenchMark IHC waste was slower than in water so the hydrogen peroxide concentration was increased to 3 mL peroxide per 250 mL of the DAB sample in BenchMark waste. The UV irradiation effectively induced DAB oxidation in BenchMark waste with the increase hydrogen peroxide concentration (FIG. 16). The DAB monomer was at or below the HPLC LOD in waste within 30 minutes.

Figure 17:
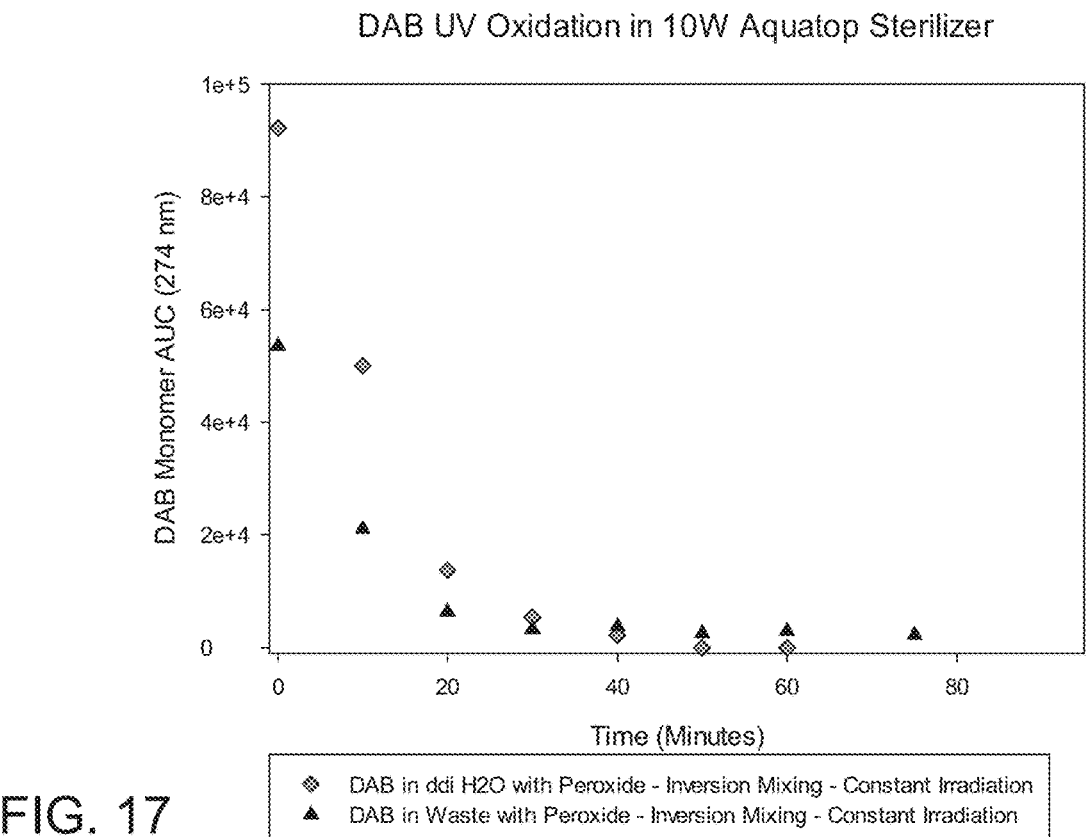
FIG. 17 shows UV oxidation rates of DAB in DDI water and BenchMark IHC waste with hydrogen peroxide.

The DAB UV oxidation rate with the 3× hydrogen peroxide concentration in BenchMark IHC waste demonstrated similar rates to that observed with 1× hydrogen peroxide in DDI water (FIG. 17). The DAB samples demonstrated a much lower stability in the OptiView DAB with TSA Amp IHC waste than in DDI water presumably due to residual activity present with the OptiView DAB with TSA Amp IHC HRP reagents. This stability issue was more prominent when hydrogen peroxide was added to the IHC waste (data not shown).

D. UV Lamp Wattage Impact

Figure 18:
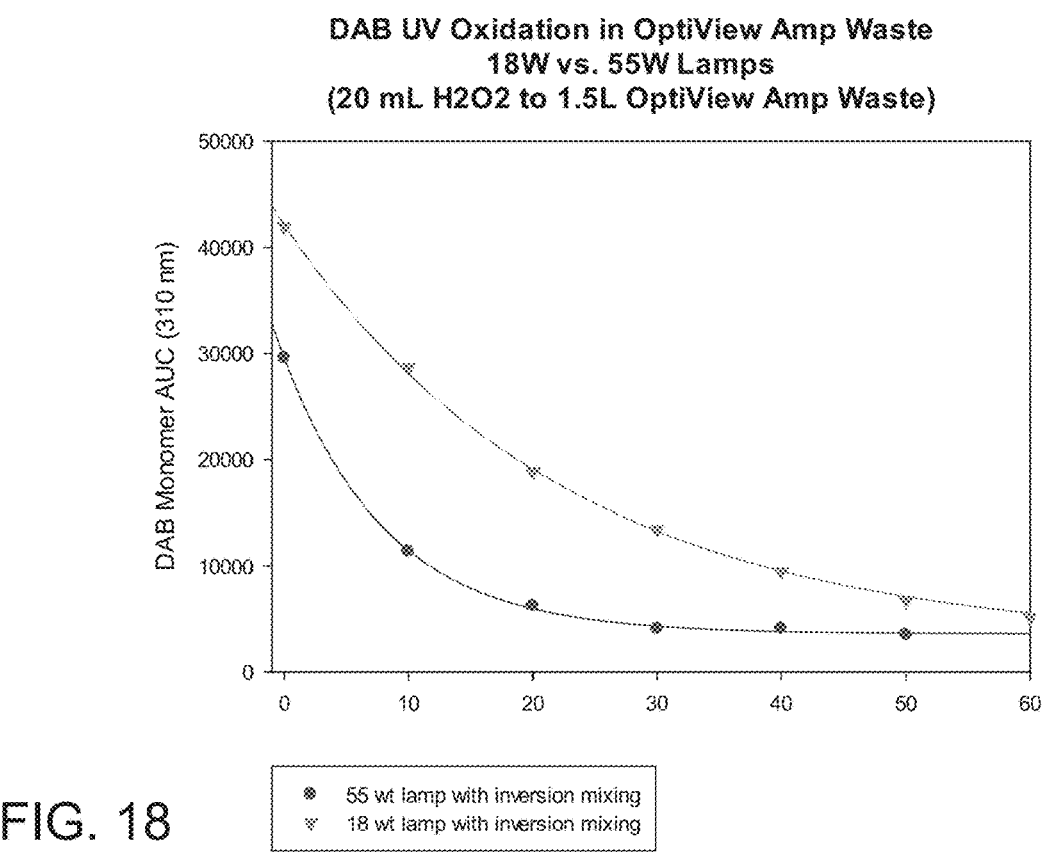
FIG. 18 shows UV oxidation rates of DAB in waste with hydrogen peroxide for an 18W lamp and a 55 W lamp.

DAB UV oxidation experiments were performed within in-line UV water sterilizers with different UV lamp wattages. A DAB sample in BenchMark Ultra OptiView DAB with TSA Amp waste (136.2 mg/L) was irradiated with 3% hydrogen peroxide (20 mL per approx. 1.5 L waste). The Aquatop in-line sterilizer was inverted (2×) using an air pocket to mix the matrix uniformly prior to sampling. The reaction mixture was analyzed by UPLC every 10 minutes. The DAB UV oxidation rates increased proportionally to the UV lamp wattage (FIG. 18). The DAB monomer decreased to the LOD for DAB in BenchMark IHC waste after 30 minutes of UV irradiation at 55 W. Approximately 90 minutes of UV irradiation at 18 W was required for the DAB monomer to decrease below the LOD for DAB in BenchMark IHC waste (three times longer with approximately ⅓ UV lamp wattage).

The DAB UV oxidation experiment was again tested in the 55 W in-line UV sterilizer as above with variable sample matrices (i.e. BenchMark IHC Waste with and without the presence of a LCS emulsion). A DAB sample in the matrix (136.2 mg/L DAB in waste) was irradiated with 3% hydrogen peroxide (20 mL per approx. 1.5 L waste). A BenchMark Ultra OptiView DAB with TSA Amp IHC Waste was used for this experiment. The aqueous layer was either separated from a majority of the LCS by gravity or thoroughly mixed and treated as an emulsion. Both DAB samples were irradiated by UV light for 60 minutes. The Aquatop in-line sterilizer was inverted (2×) using an air pocket to mix the matrix uniformly prior to sampling. The reaction mixture was analyzed by UPLC every 10 minutes.

Figure 19A:
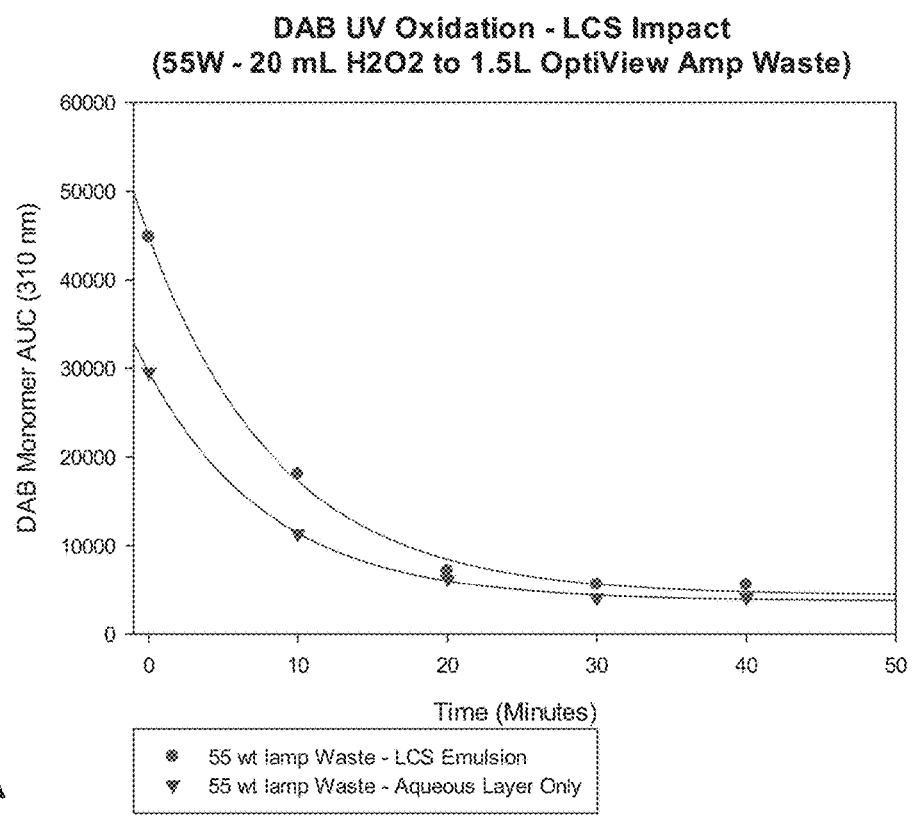
FIG. 19A shows UV oxidation rates of DAB in waste with hydrogen peroxide using a 55 W lamp for an LCS emulsion with DAB and an aqueous-only layer with DAB.

The UV irradiation effectively induced DAB oxidation both matrices; however, the DAB oxidation rate was slightly slower in BenchMark IHC Waste with a LCS emulsion (FIG. 19A). The DAB monomer decreased to the LOD for DAB in both BenchMark IHC waste matrices near 30 to 40 min UV irradiation at 55 W. Most of the LCS in the BenchMark IHC waste LCS emulsion rapidly separated from the aqueous layer inside the in-line UV sterilizer and was irradiated as with the aqueous layer only in the bottom portion of the sterilizer. The DAB monomer was not detectable by RP UPLC analysis in DDI water after 20 to 30 min irradiation in 55 W UV in-line sterilizer under similar experimental conditions (data not shown).

Figure 19B:
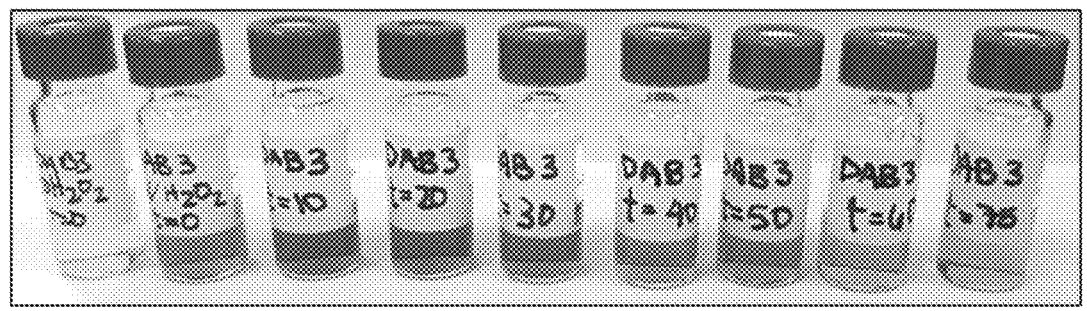
FIG. 19B shows DAB UV oxidation samples in BenchMark IHC waste with an LCS emulsion, taken at varying times of irradiation, after storage overnight at 10° C. The DAB analytical samples were centrifuged at 14K for 2 minutes prior to HPLC analysis to remove the LCS emulsion and DAB solid polymer precipitate.
Figure 19C:
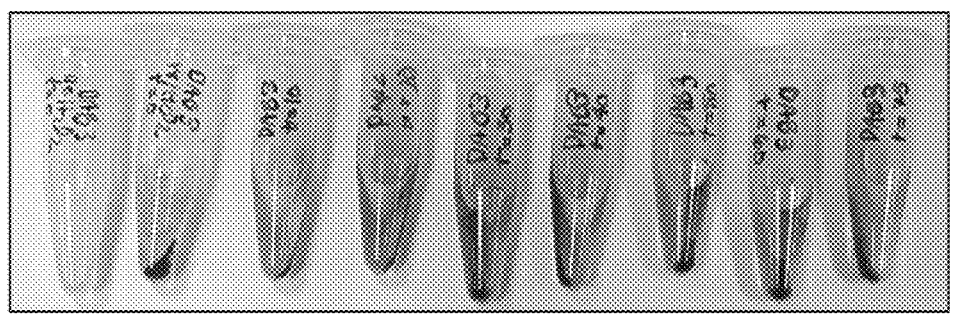
FIG. 19C shows DAB UV oxidation samples in BenchMark IHC waste with an LCS emulsion taken at varying times of irradiation. The microcap samples are shown following 14 k centrifugation for 4 min after storage overnight at room temperature.

More insoluble DAB UV oxidation polymer products were observed in BenchMark IHC waste with the 55 W in-line UV sterilizer lamp. This was more apparent when the DAB sample was UV oxidized in BenchMark IHC waste with an LCS emulsion. The DAB analytical samples were centrifuged at 14K for 2 minutes prior to HPLC analysis to remove the LCS emulsion and DAB solid polymer precipitate. The samples progressively showed less color as the UV oxidation reaction progressed demonstrating the amount of DAB removed by polymerization (FIG. 19B). The microcap tubes confirm the same result after storage at room temperature overnight (FIG. 19C). In these samples, more DAB polymer precipitated in the presence of LCS and hydrogen peroxide. The HPLC sample vial at t=0 with peroxide still showed oxidized DAB in solution, whereas all DAB polymerized from solution in the microcap tube and no color was left in solution. HPLC analysis confirmed no DAB monomer was detected in the microcap tube sample.

E. Top-Down UV Irradiation Test Bed Testing

Matrix Layer Thickness Impact

The 36 W top-down UV irradiation test bed without direct sample liquid contact to the UV light source was used to investigate matrix layer thickness tolerance during DAB UV irradiation (FIGS. 9A-9C). UV light is absorbed as it goes through a liquid medium causing the aqueous layer furthest from the lamp to receive less UV irradiation. A DAB sample in Reaction Buffer matrix was prepared at the expected waste concentration with approximately 20% (v/v) LCS. OptiView DAB IHC detection kit DAB chromogen, detection peroxide and inhibitor peroxide reagents were added to BenchMark Reaction Buffer matrix (143 µL each reagent per 250 mL). The 36 W top-down UV irradiation test bed bottom was filled with a specific matrix layer thickness (i.e. 10, 20 or 30 mm thickness). The DAB sample was treated with UV irradiation without mixing and a sample was removed every 2 minutes to 10 minutes and then every 5 minutes thereafter through 30 minutes. The matrix sample was analyzed by RP UPLC.

Figure 20:
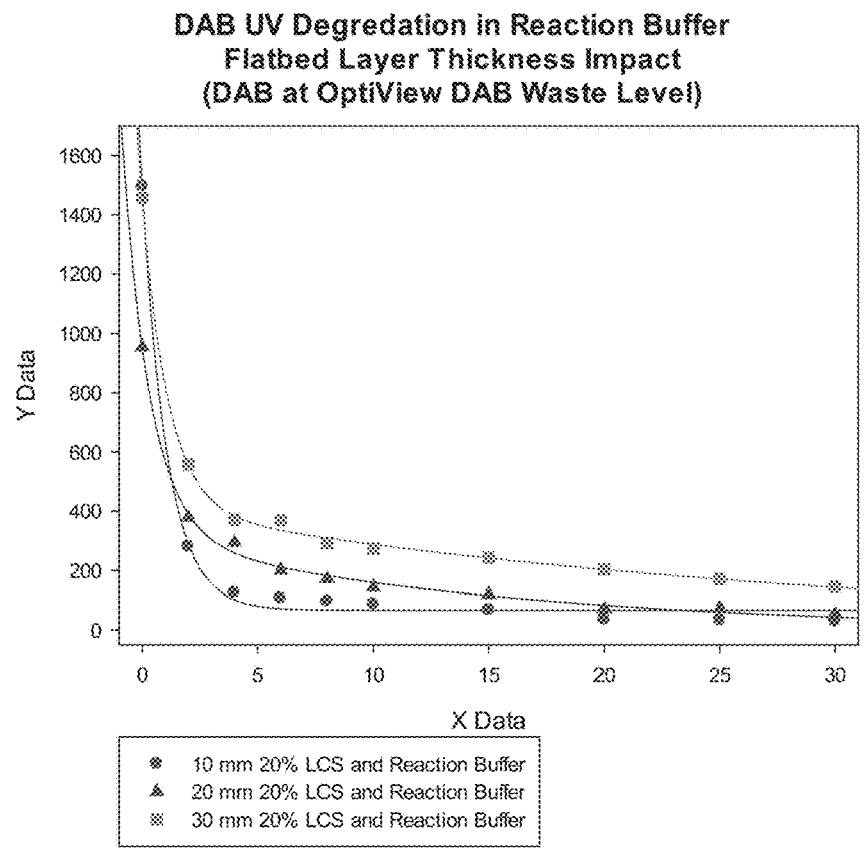
FIG. 20 shows UV oxidation of DAB in a reaction buffer using a 36 W top-down UV irradiation test bed at varying flatbed layer thicknesses of the DAB sample.

No DAB monomer was detected after 2 to 4 minutes of UV radiation for all aqueous layer thicknesses; however, they all varied for total AUC for DAB monomer and initial oxidized intermediates (FIG. 20). These intermediates were observed longer as the layer thickness progressed. The 10 mm sample matrix showed no DAB intermediates (e.g. DAB dimers, trimers, etc.) after 15 to 20 minutes UV irradiation. The 20 mm matrix sample was done in 25 minutes while the 30 mm sample still showed these intermediates after 30 min irradiation.

LCS Emulsion Impact on Top-Down UV Irradiation

The 36 W top-down UV irradiation test bed without direct sample liquid contact to the UV light source was used to investigate how LCS could be tolerated during DAB UV irradiation in a top-down configuration. A DAB sample in Reaction Buffer matrix was prepared at the expected waste concentration with or without approximately 20% (v/v) LCS. OptiView DAB IHC detection kit DAB chromogen, detection peroxide and inhibitor peroxide reagents were added to Reaction Buffer matrix (143 µL each reagent per 250 mL). These Reaction Buffer/LCS mixed matrix was tested with LCS not mixed, mixed by inversion 20× to form an initial bubble LCS emulsion, and vigorously mixed to form an initial opaque LCS emulsion.

Figure 21:
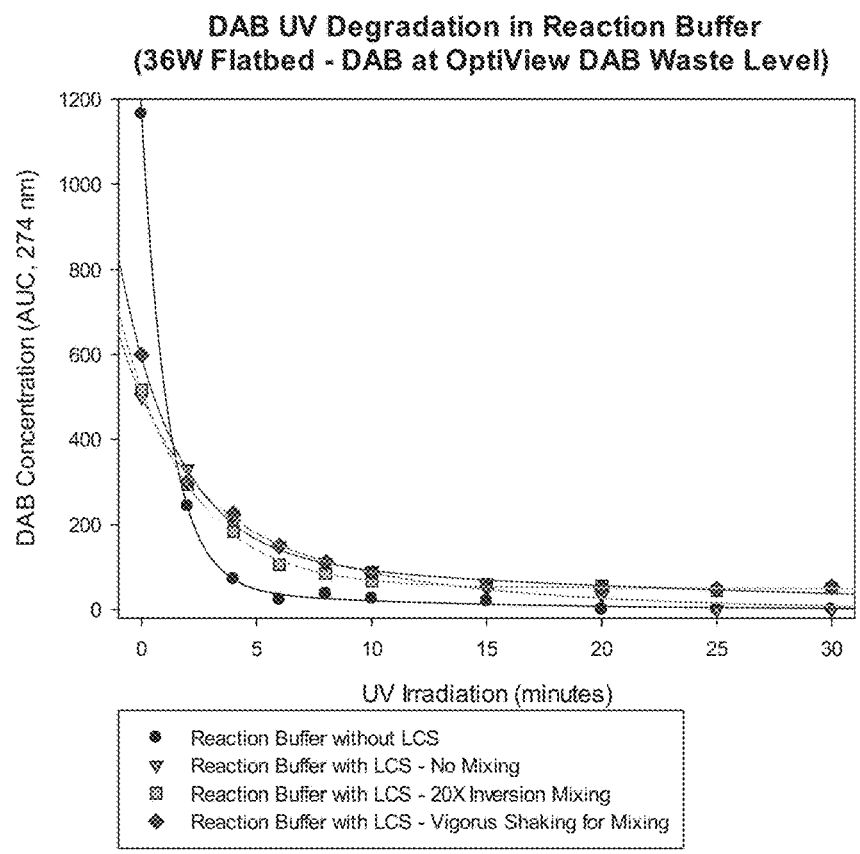
FIG. 21 shows UV oxidation of DAB using a 36 W top-down UV irradiation test bed for DAB in reaction buffer with or without LCS emulsions.

The 36 W top-down UV irradiation test bed bottom was filled with a 10 mm volume layer thickness. The DAB sample was treated with UV irradiation without mixing and a sample was removed every 2 minutes to 10 minutes and then every 5 minutes thereafter through 30 minutes. The matrix sample was analyzed by RP UPLC. No DAB monomer was detected after 2 to 4 minutes of UV radiation for all sample matrices; however, they all varied for total AUC for DAB monomer and initial oxidized DAB intermediates (e.g. DAB dimers, trimers, etc.; FIG. 21). These DAB intermediates remained in solution longer when the opaque white LCS layer was present. The Reaction Buffer only sample matrix showed no intermediates after 4 to 6 minutes of UV irradiation. The clear LCS layered matrix sample showed no intermediated after about 10 to 15 minutes of UV irradiation while the other emulsion samples were done in 20 to 25 minutes of UV irradiation.

F. Free Radical Initiator Screening

DAB Decomposition with UV Radical Initiators

Radical initiator screening experiments were performed in the Aquatop 10 W in-line UV sterilizer as above with variable hydrogen peroxide concentrations. A DAB sample in BenchMark Reaction Buffer (68.1 mg/L) was irradiated with or without the presence of a radical initiator. The radical initiator molarity was maintained at the molarity previously used with hydrogen peroxide (approx. 0.882 mmol per 250 mL sample). The radical initiator was added to the DAB sample and irradiated by UV light for 30 min. The Aquatop in-line sterilizer was inverted (2×) using an air pocket to mix the matrix uniformly prior to sampling. The reaction mixture was analyzed by UPLC every 2 minutes through 10 minutes and then every 5 minutes thereafter.

Different radical initiator classes were screened in DAB UV oxidation. The initiators included: UV peroxide photoinitiators (hydrogen peroxide and peracetic acid), thermal peroxide initiators (benzoyl peroxide), azo thermal/photolysis initiators (azobisisobutyronitrile-AIBN), nitroxide radical initiators (TEMPO), and organic photosensitizers (4,4'-bisdiethylaminobenzophenone-BDABP and 4-aminobenzophenone-ABP). The new radical initiators were compared to ammonium persulfate (APS), a dianion oxidation agent known to rapidly dissociate to form 2 sulfate radical equivalents. The organic radical initiators demonstrated a varied solubility in water. Only hydrogen peroxide, peracetic acid and ammonium persulfate were completely soluble in water. Semiconductor nano materials (e.g $TiO_2$, $SnO_2$, $ZnO$, $Fe_2O_3$, CdS, etc.) are also known to accelerate AOP processes. These radical initiators can be used alone or synergistically to further accelerate DAB oxidation rates.

The UV irradiation effectively promoted DAB oxidation in absence of hydrogen peroxide; however, the DAB oxidation rate was accelerated by the hydrogen peroxide in BenchMark Reaction Buffer. Less than 5% DAB monomer was detected after 60 minutes of UV irradiation in the presence of hydrogen peroxide. Approximately 38% of the DAB monomer was still detectable after 60 minutes UV irradiation in absence of hydrogen peroxide. These oxidation rates were slower than that previously observed in DDI water (FIGS. 14A and 15).

Figure 22:
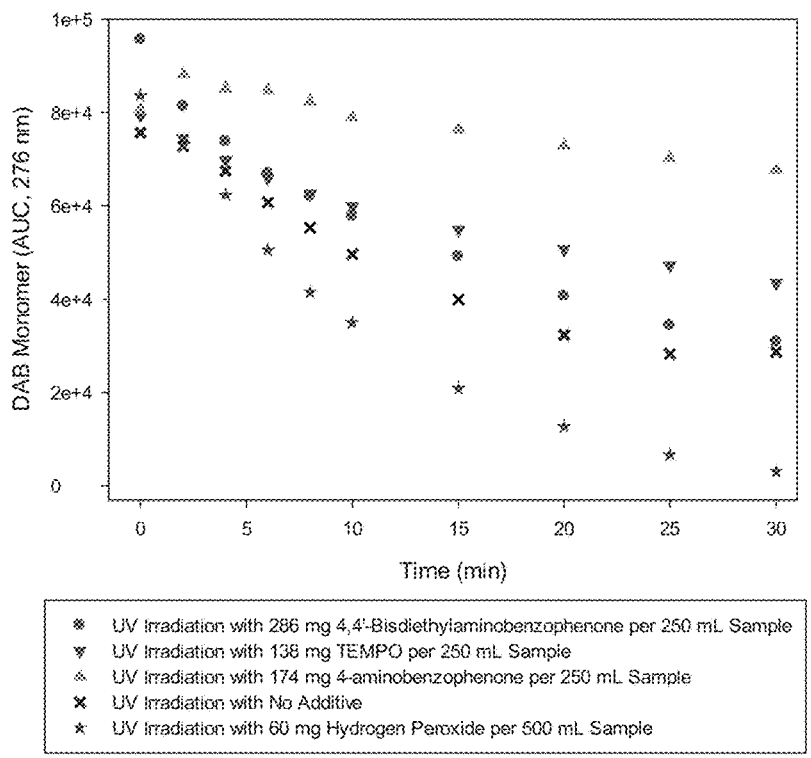
FIG. 22 shows UV oxidation of DAB in reaction buffer without a radical initiator or with different radical initiator classes.
Figure 23:
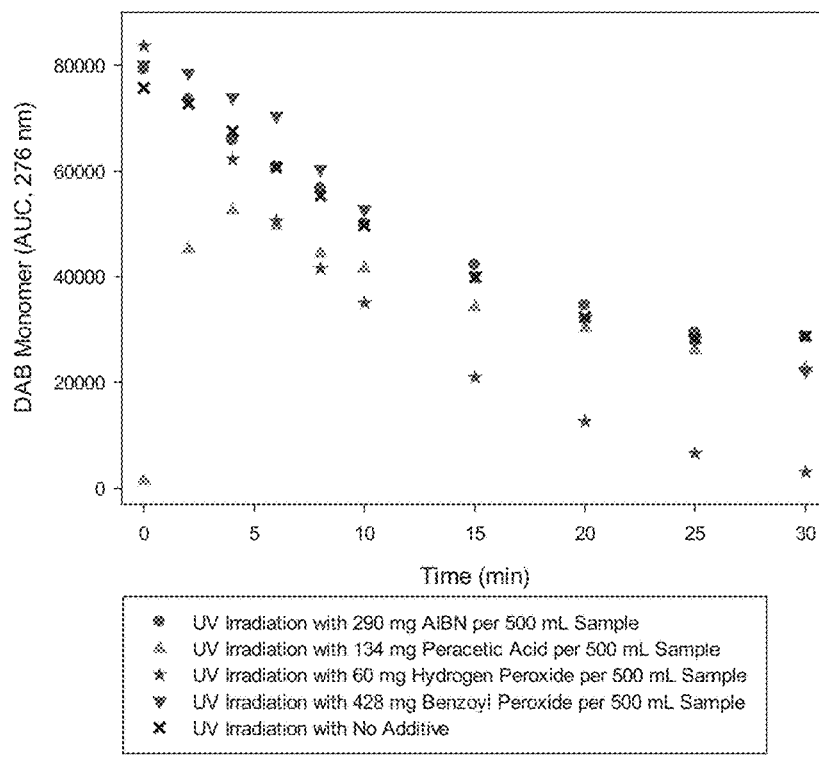
FIG. 23 shows another UV oxidation of DAB in reaction buffer without a radical initiator or with different radical initiator classes.

TEMPO and ABP appeared to inhibit DAB oxidation in water when exposed to UV light (FIG. 22). HPLC analyses showed more residual DAB monomer present after 30 minutes UV exposure with both TEMPO and ABP (Table 3). AIBN appeared to have a minimal impact on DAB UV oxidation with a subtle more DAB loss observed (FIG. 23). BDABP, benzoyl peroxide and peracetic acid all decreased the amount of DAB monomer found in solution after 30 min UV exposure though their impact was much reduced relative to hydrogen peroxide. Peracetic acid formed an insoluble salt with DAB, which dissolved upon peracetic acid UV decomposition to its radical products (methyl/hydroxyl radicals and $CO_2$ gas). APS readily consumed all DAB demonstrating almost >95% loss after 2 minutes exposure to APS. No DAB polymers precipitated from solution with any UV radical initiators in BenchMark Reaction Buffer.

TABLE 3

Percent DAB lost from UV irradiation with Radical Initiators

| Radical Initiator | % Loss DAB (30 min UV) |
| --- | --- |
| No Initiator | 62% |
| Hydrogen Peroxide | 96% |
| Peracetic Acid | 73% |
| Benzoyl Peroxide | 72% |
| BDABP | 68% |
| AIBN | 64% |
| TEMPO | 45% |
| ABP | 16% |
| APS | 100% |

DAB Decomposition with Thermal Radical Initiators

Sonication can to form acoustic cavitation in liquids causing the formation, growth and implosive collapse of bubbles and heat generation. Sonication was used to thermally activate thermal radical initiators to induce DAB decomposition. Thermal radical initiator screening experiments were performed using a Misonix Sonicator 3000 Ultrasonic Liquid Processor. The sonicator voltage converter and horn were connected to a microtip probe. The Misonix Sonicator 3000 power setting was set to 7.5 and programmed to cycle on and off every 30 s for 30 minutes. A DAB sample in RTD BenchMark Reaction Buffer (68.1 mg/L) was sonicated with or without the presence of a thermal radical initiator. The radical initiator molarity was maintained at the molarity previously used with hydrogen peroxide (approx. 0.0882 mmol per 25 mL sample). The sonication mixed the sample efficiently. The reaction mixture was analyzed by UPLC every 5 minutes through 30 minutes.

Figure 24:
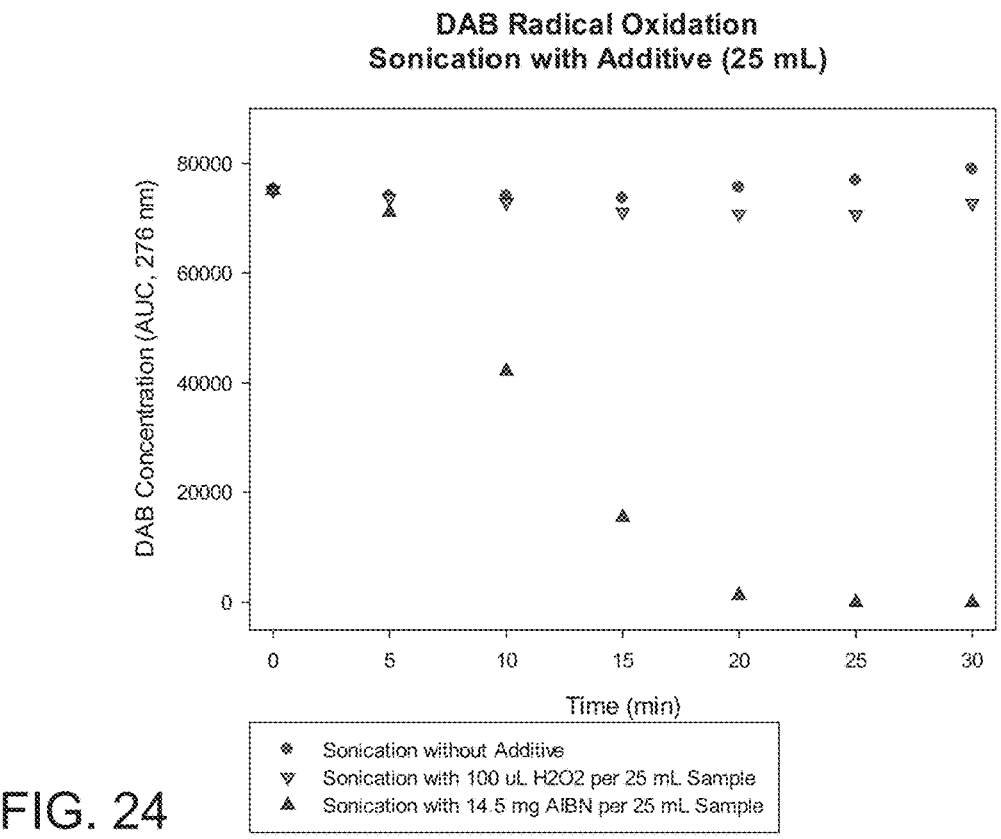
FIG. 24 shows UV oxidation of DAB in reaction buffer sonicated with or a radical initiator.

DAB solution sonication without a radical initiator failed to show any discernable DAB degradation (FIG. 24). The sonication caused thermal heating and subtle concentration by evaporation after 15 to 20 minutes of sonication. Sonication with hydrogen peroxide also failed to show any substantial DAB decomposition. Sonication with the thermal radical initiator AIBN effectively removed DAB monomer from solution. No DAB monomer was detected by UPLC analyses after 25 minutes of sonication. AIBN was initially not highly soluble in BenchMark Reaction Buffer; however, the radical initiator dissolved upon sonication and decomposed releasing $N_2$ gas. A dark DAB polymer product began to form in solution as with prior DAB UV oxidations with hydrogen peroxide in DDI water.

DAB degradation by thermal radical initiation was attempted with benzoyl peroxide in BenchMark Reaction Buffer. As stated above, benzoyl peroxide has a very low solubility in BenchMark Reaction Buffer. Sonication caused rapid DAB monomer disappearance from solution where no DAB monomer was detectable after 5 minutes. The benzyl peroxide appeared to rapidly solubilize and then cause DAB precipitation from solution as a DAB benzoate salt as a yellow orange solid. Further sonication failed to fully decompose this salt to a dark brown DAB oxidation polymer.

DAB sonication with APS readily consumed all DAB within 5 minutes sonication with APS. Unlike the UV irradiation experiment with APS, insoluble DAB polymers precipitated from BenchMark Reaction Buffer during sonication with APS. Larger DAB polymers presumably formed with mixing caused by liquid cavitation with sonication. Other azo water soluble thermal radical initiators [2,2'- azobis(2-methylpropionamidine) and 4,4'-azobis(4-cyanovaleric acid)] promoted DAB oxidation with sonication as afforded by AIBN.

Conclusions

Investigations were performed to examine various levers that could impact AOP activity using a radical generator on BenchMark IHC waste to oxidize DAB. These levers were tested in DDI water, BenchMark Reaction Buffer and in BenchMark DAB IHC waste matrices. These levers were tested in a system where the radical generator utilized a UV irradiation source. Test beds included a flow through UV test bed device, a top-down non-contact UV irradiation test bed, and a test bed which combined water/oil separation and UV irradiation of DAB aqueous IHC waste effluent.

Several levers tested were found to impact DAB UV oxidation rates. For example, in some embodiments, increasing UV lamp power (wattage), radical initiator concentration (hydrogen peroxide), and/or mechanical sample mixing provided faster DAB UV oxidation kinetics. Larger polymer species were produced in some cases. Complete DAB precipitation could promote conditions where all DAB could be removed by filtration. A wide variety of radical initiators were screened and found to be effective to promote DAB degradation in a radical generator. These radical initiators could be used alone or synergistically to promote more rapid DAB degradation.

In other embodiments, the thickness of matrix layer was an important factor when the radical generator utilized UV irradiation. DAB UV oxidation rates slowed with increased layer thickness. UV light absorbs as it goes through water causing the outer portion of the aqueous layer furthest from the UV lamp to receive less UV irradiation in absence of mixing. Mechanical mixing may be required if the test bed used aqueous matrix layers greater than 10 mm thickness.

In some embodiments, waste matrix impurities (i.e. LCS, DAB oxidation products, etc.) generally absorbed UV light and caused slower DAB degradation rates. UV light absorption may be caused by solution color or opacity. LCS was well-tolerated within in-line, flow-through UV irradiation test beds as the LCS separated rapidly from the aqueous layer, allowing sufficient irradiation directly to an aqueous layer in the lower separated layer. In other embodiments, top-down UV irradiation test beds were less tolerant to the opaqueness that LCS emulsions could provide. These systems would benefit from LCS layer separation prior to UV irradiation.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

ADDITIONAL EMBODIMENTS

Additional Embodiment 1

A passive, gravity-driven treatment system, operatively coupled to a diagnostic system, for treatment of a waste stream exiting the diagnostic system, wherein the gravity-driven treatment system comprises:
(a) a homogenizing reservoir fluidly connected to the diagnostic system for receiving a radical initiator and said waste stream exiting the diagnostic system at a given flow rate, wherein the waste stream comprises a set of fluid components having an aqueous component containing one or more target compounds, wherein a residence time of each fluid component in the homogenizing reservoir is sufficient for promoting an even mixing of the set of fluid components to form a homogenous target effluent at or near a first outlet of the homogenizing reservoir;
(b) a radical generating reservoir, wherein the target effluent is routed from the first outlet of the homogenizing reservoir to the radical generating reservoir via a channel, wherein gravity facilitates flow of the target effluent from the homogenizing reservoir to the radical generating reservoir;
(c) a radical generator coupled to the radical generating reservoir, wherein the radical generator is configured to irradiate the target effluent while the target effluent is disposed in the radical generating reservoir, and promote advanced oxidation processes (AOPs) that breakdown said target compound, wherein the radical initiator is effective for accelerating said AOPs when the radical initiator is exposed to the radical generator, thus reducing a detectable concentration of the target compound and the target effluent becomes a treated effluent; and
(d) a first disposal unit coupled to the radical generating reservoir, wherein the first disposal unit receives the treated effluent exiting from a waste outlet of the radical generating reservoir.

Additional Embodiment 2

The system of additional embodiment 1, wherein the residence time is a function of the given flow rate and dimensions of the homogenizing reservoir.

Additional Embodiment 3

The system of additional embodiment 2, wherein said dimensions of the homogenizing reservoir comprise a height, a cross-sectional surface area, and a volume of the homogenizing reservoir.

Additional Embodiment 4

The system of additional embodiment 1, wherein the set of fluid components further comprises an oil component, wherein as a result of buoyancy, the oil component rises and floats above the aqueous component when in the homogenizing reservoir.

Additional Embodiment 5

The system of additional embodiment 4, further comprising a second disposal unit (209) for receiving the oil component draining from an oil waste outlet of the homogenizing reservoir, wherein said draining of the oil component is facilitated by gravity.

Additional Embodiment 6

The system of additional embodiment 4, wherein a line of separation (219) between the aqueous component and the oil component in the homogenizing reservoir is calculated based on a density of the aqueous component, $\rho_w$, and a density of the oil component, $\rho_w$.

Additional Embodiment 7

The system of additional embodiment 6, wherein a first height, $h_0$, between the line of separation and a topmost location of the oil waste outlet, determines a second height, $\Delta h$, between the topmost location of the oil waste outlet and a topmost location of the waste outlet of the radical generating reservoir, wherein $\Delta h$ is calculated as follows:

$$\Delta h = h_0 \left[ 1 - \frac{\rho_0}{\rho_w} \right].$$

Additional Embodiment 8

A passive, gravity-driven treatment system for treatment of a waste stream exiting a diagnostic system, wherein the system comprises:
(a) a homogenizing reservoir fluidly connected to the diagnostic system for receiving the waste stream and a radical initiator, wherein the waste stream comprises an oil-phase fluid component and an aqueous fluid component containing at least one target compound, wherein as a result of buoyancy, the oil-phase fluid component rises and floats above the aqueous fluid component when in the homogenizing reservoir so as to form an upper layer of oil effluent and a lower layer of target effluent, wherein the radical initiator is disposed in the target effluent;
(b) a radical generating reservoir fluidly connected to the homogenizing reservoir via a channel, wherein the channel is connected to a first outlet of the homogenizing reservoir and to an inlet of the radical generating reservoir, wherein the first outlet is positioned near a base of the homogenizing reservoir, wherein the inlet is positioned at or near a base of the radical generating reservoir, wherein gravity facilitates flow of the target effluent from the homogenizing reservoir to the radical generating reservoir via the channel;
(c) a radical generator coupled to the radical generating reservoir, wherein the radical generator is configured to irradiate the target effluent while the target effluent is disposed in the radical generating reservoir, and promote advanced oxidation processes (AOPs) that breakdown said target compound, wherein the radical initiator is effective for accelerating said AOPs when the radical initiator is exposed to the radical generator, thus reducing a detectable concentration of the target compound and the target effluent becomes a treated effluent;
(d) a first disposal unit for receiving the treated effluent exiting from a waste outlet of the radical generating reservoir; and
(e) a second disposal unit (209) for receiving the oil effluent exiting from an oil waste outlet of the homogenizing reservoir, wherein the oil waste outlet is positioned above the lower layer of target effluent so as to provide a route for gravity-facilitated drainage of the oil effluent from the homogenizing reservoir.

Additional Embodiment 9

The system of additional embodiment 8, wherein a residence time of each fluid component in the homogenizing reservoir is sufficient for separating the oil-phase fluid component from the aqueous fluid component, and for an even mixing of the aqueous fluid component and the radical initiator, wherein the residence time is a function of the given flow rate and dimensions of the homogenizing reservoir.

Additional Embodiment 10

The system of additional embodiment 9, wherein the homogenizing reservoir is substantially cylindrical, wherein said dimensions of the homogenizing reservoir comprise a height and a radius of the homogenizing reservoir.

Additional Embodiment 11

A passive, gravity-driven treatment system for treatment of a waste stream exiting a diagnostic system, wherein the gravity-driven treatment system comprises:
(a) a homogenizing reservoir fluidly connected to the diagnostic system for receiving the waste stream comprising at least one target compound and one or more fluid components, wherein a residence time of each fluid component in the homogenizing reservoir is sufficient for promoting one or more of the following: i) an even mixing of aqueous fluid components to form an aqueous effluent; ii) an even mixing of non-aqueous fluid components to form a non-aqueous effluent; or iii) separation of the non-aqueous effluent from the aqueous effluent, wherein the target compound is disposed in either the non-aqueous effluent or the aqueous effluent, said effluent containing the target compound is hereinafter referred to as the target effluent;
(b) a radical generating reservoir for receiving the target effluent from the homogenizing reservoir via a channel fluidly connecting the reservoirs, wherein gravity facilitates flow of the target effluent from the homogenizing reservoir to the radical generating reservoir; and
(c) a radical generator coupled to the radical generating reservoir, wherein the radical generator is configured to irradiate the target effluent while the target effluent is disposed in the radical generating reservoir, and promote advanced oxidation processes (AOPs) that breakdown said target compound, thereby reducing a detectable concentration of the target compound and the target effluent becomes a treated effluent.

Additional Embodiment 12

The system of additional embodiment 11, further comprising a radical initiator that is added into the homogenizing reservoir, wherein the radical initiator is disposed in the target effluent, wherein the radical initiator is capable of accelerating the AOPs when the radical initiator is exposed to the radical generator.

Additional Embodiment 13

The system of additional embodiment 11, further comprising a first disposal unit fluidly coupled to a waste outlet of the radical generating reservoir for receiving the treated effluent.

Additional Embodiment 14

The system of additional embodiment 11, further comprising a second disposal unit (209) fluidly coupled to a waste outlet of the homogenizing reservoir for receiving the effluent without the target compound exiting from the homogenizing reservoir.

Additional Embodiment 15

The system of additional embodiment 11, wherein the residence time is a function of a given flow rate of the one or more fluid components and dimensions of the homogenizing reservoir.

Additional Embodiment 16

The system of additional embodiment 14, wherein said dimensions of the homogenizing reservoir comprise a height, a cross-sectional surface area, and a volume of the homogenizing reservoir.

Additional Embodiment 17

The system of additional embodiment 1, wherein the target compound is 3,3'-diaminobenzidine (DAB).

Additional Embodiment 18

The system of any additional embodiment 1, wherein the fluid components further comprises a biofilm or partially dried sludge.

Additional Embodiment 19

The system of any additional embodiment 1, wherein a drain valve (203) is disposed at a base of the homogenizing reservoir, wherein the drain valve (203) is effective for draining the system.

Additional Embodiment 20

The system of additional embodiment 1, wherein the radical initiator is an ultraviolet ("UV") peroxide photoinitiator, a thermal peroxide initiator, an azo thermal/photolysis initiator, a nitroxide radical initiator, an organic photosensitizer, or an inorganic semiconductor nanomaterial employed individually or in combination.

Additional Embodiment 21

The system of additional embodiment 1, wherein the radical generator comprises a UV irradiation source.

Additional Embodiment 22

The system of additional embodiment 21, wherein the UV irradiation source of the radical generator is a mercury lamp, a gas-discharge/deuterium lamp, a metal-halide arc lamp, a tungsten-halogen incandescent bulb, a light-emitting diode, a laser, a plasma extreme ultraviolet source, or a tunable vacuum UV source.

Additional Embodiment 23

The system of additional embodiment 21, wherein the UV irradiation source has a power range of 1 W or greater.

Additional Embodiment 24

The system of additional embodiment 21, wherein the radical generator comprises one or more UV irradiation sources in parallel or series.

Additional Embodiment 25

The system of additional embodiment 1, wherein the radical generator is disposed inside the radical generating reservoir so as to form an in-line flow-through UV irradiation system.

Additional Embodiment 26

The system of additional embodiment 25, wherein the target effluent is actively mixed, dwell mixed, or not mixed while in the radical generating reservoir.

Additional Embodiment 27

The system of additional embodiment 1, wherein the radical generator is positioned at a distance from and above the radical generating reservoir so as to form a top-down UV irradiation system.

Additional Embodiment 28

The system of any one of additional embodiment 1, wherein a feedback mechanism is coupled to the radical generator for ensuring that an amount of UV light irradiating the target effluent is greater than a predetermined threshold.

Additional Embodiment 29

The system of additional embodiment 28, wherein the feedback mechanism comprises a UV sensor (210) for measuring the amount of UV light irradiating the target effluent.

Additional Embodiment 30

A method for treating a waste stream exiting a diagnostic system, the method comprising:
(a) providing a passive, gravity-driven treatment system of claim 1, operatively coupled to the diagnostic system;
(b) providing a radical initiator;

(c) introducing, into the homogenizing reservoir, the radical initiator and the waste stream exiting the diagnostic system at a given flow rate, wherein said waste stream comprises a set of fluid components having an aqueous component containing one or more target compounds, wherein a residence time of each fluid component in the homogenizing reservoir is sufficient for promoting an even mixing of the set of fluid components to form a target effluent;

(d) introducing the target effluent from the homogenizing reservoir into the radical generating reservoir via the channel, wherein gravity facilitates flow of the target effluent from the homogenizing reservoir to the radical generating reservoir;

(e) irradiating the target effluent, via the radical generator, while the target effluent is disposed in the radical generating reservoir, wherein said irradiation causes advanced oxidation processes (AOPs) that breakdown said target compound, wherein the radical initiator accelerates said AOPs when the radical initiator is exposed to the radical generator, thus reducing a detectable concentration of the target compound and the target effluent becomes a treated effluent; and (f) draining the treated effluent exiting from the waste outlet of the radical generating reservoir into the first disposal unit.

Additional Embodiment 31

The method of additional embodiment 30, wherein the residence time is a function of the given flow rate and dimensions of the homogenizing reservoir.

Additional Embodiment 32

The method of additional embodiment 31, wherein said dimensions of the homogenizing reservoir comprise a height, a cross-sectional surface area, and a volume of the homogenizing reservoir.

Additional Embodiment 33

The method of additional embodiment 30, wherein the set of fluid components further comprises an oil component, wherein as a result of buoyancy, the oil component rises and floats above the aqueous component when in the homogenizing reservoir.

Additional Embodiment 34

The method of additional embodiment 33, further comprising draining the oil component exiting from an oil waste outlet of the homogenizing reservoir into a second disposal unit (209), wherein said draining of the oil component is facilitated by gravity.

Additional Embodiment 35

The method of additional embodiment 33, wherein a line of separation (219) between the aqueous component and the oil component in the homogenizing reservoir is calculated based on a density of the aqueous component, $\rho_w$, and a density of the oil component, $\rho_w$.

Additional Embodiment 36

The method of additional embodiment 35, wherein a first height, $h_0$, between the line of separation and a topmost location of the oil waste outlet, determines a second height, $\Delta h$, between the topmost location of the oil waste outlet and a topmost location of the waste outlet of the radical generating reservoir, wherein $\Delta h$ is calculated as follows:

$$\Delta h = h_0 \left[1 - \frac{\rho_0}{\rho_w}\right].$$

Additional Embodiment 37

A method for treating a waste stream exiting a diagnostic system, the method comprising:

(a) providing a passive, gravity-driven treatment system of claim 8, operatively coupled to the diagnostic system;

(b) providing a radical initiator;

(c) introducing the waste stream from the diagnostic system and the radical initiator into the homogenizing reservoir, wherein said waste stream comprises an oil-phase fluid component and an aqueous fluid component containing at least one target compound, wherein as a result of buoyancy, the oil-phase fluid component rises and floats above the aqueous fluid component when in the homogenizing reservoir so as to form an upper layer of oil effluent and a lower layer of target effluent, wherein the radical initiator is disposed in the target effluent;

(d) introducing the target effluent from the homogenizing reservoir into the radical generating reservoir via the channel, wherein gravity facilitates flow of the target effluent from the homogenizing reservoir to the radical generating reservoir;

(e) irradiating the target effluent, via the radical generator, while the target effluent is disposed in the radical generating reservoir, wherein said irradiation causes advanced oxidation processes (AOPs) that breakdown said target compound, wherein the radical initiator accelerates said AOPs when the radical initiator is exposed to the radical generator, thus reducing a detectable concentration of the target compound and the target effluent becomes a treated effluent;

(f) draining the treated effluent exiting from the waste outlet of the radical generating reservoir into the first disposal unit; and (g) draining the oil effluent exiting from oil waste outlet of the homogenizing reservoir into the second disposal unit (209), wherein said draining of the oil effluent is facilitated by gravity.

Additional Embodiment 38

The method of additional embodiment 37, wherein a residence time of each fluid component in the homogenizing reservoir is sufficient for separating the oil-phase fluid component from the aqueous fluid component, wherein the residence time is a function of the given flow rate and dimensions of the homogenizing reservoir.

Additional Embodiment 39

The method of additional embodiment 38, wherein the homogenizing reservoir is substantially cylindrical, wherein said dimensions of the homogenizing reservoir comprise a height and a radius of the homogenizing reservoir.

Additional Embodiment 40

A method for treating a waste stream exiting a diagnostic system, the method comprising:
(a) providing a passive, gravity-driven treatment system of claim 11, operatively coupled to the diagnostic system;
(b) introducing the waste stream from the diagnostic system into the homogenizing reservoir, wherein said waste stream comprises at least one target compound and one or more fluid components, wherein a residence time of each fluid component in the homogenizing reservoir is sufficient for promoting one or more of the following: i) an even mixing of aqueous fluid components to form an aqueous effluent; ii) an even mixing of non-aqueous fluid components to form a non-aqueous effluent; or iii) separation of the non-aqueous effluent from the aqueous effluent,
wherein the target compound is disposed in either the non-aqueous effluent or the aqueous effluent, said effluent containing the target compound is hereinafter referred to as the target effluent;
(c) introducing the target effluent into the radical generating reservoir via the channel, wherein gravity facilitates flow of the target effluent from the homogenizing reservoir to the radical generating reservoir; and
(d) irradiating the target effluent, via the radical generator, while the target effluent is disposed in the radical generating reservoir, wherein said irradiation causes advanced oxidation processes (AOPs) that breakdown said target compound, thereby reducing a detectable concentration of the target compound and the target effluent becomes a treated effluent.

Additional Embodiment 41

The method of additional embodiment 40, further comprising introducing a radical initiator into the homogenizing reservoir, wherein the radical initiator is disposed in the target effluent and introduced into the radical generating reservoir, wherein the radical initiator accelerates the AOPs when the radical initiator is exposed to the radical generator.

Additional Embodiment 42

The method of additional embodiment 40, further comprising draining the treated effluent exiting from the waste outlet of the radical generating reservoir into the first disposal unit.

Additional Embodiment 43

The method of additional embodiment 40, further comprising draining the effluent without the target compound exiting from a waste outlet of the homogenizing reservoir into the second disposal unit (209).

Additional Embodiment 44

The method of any one of additional embodiment, wherein the residence time is a function of a given flow rate of the one or more fluid components and dimensions of the homogenizing reservoir.

Additional Embodiment 45

The method of additional embodiment 44, wherein said dimensions of the homogenizing reservoir comprise a height, a cross-sectional surface area, and a volume of the homogenizing reservoir.

Additional Embodiment 46

The method of additional embodiment 30, wherein the target compound is 3,3'-diaminobenzidine (DAB).

Additional Embodiment 47

The method of additional embodiment 30, wherein the fluid components further comprises a biofilm or partially dried sludge.

Additional Embodiment 48

The method of additional embodiment 30, wherein a drain valve (203) is disposed at a base of the homogenizing reservoir for providing a means to draining the system.

Additional Embodiment 49

The method of additional embodiment 30, wherein the radical initiator is an ultraviolet ("UV") peroxide photoinitiator, a thermal peroxide initiator, an azo thermal/photolysis initiator, a nitroxide radical initiator, an organic photosensitizer, or an inorganic semiconductor nanomaterial employed individually or in combination.

Additional Embodiment 50

The method of additional embodiment 30, wherein the radical generator comprises a UV irradiation source.

Additional Embodiment 51

The method of additional embodiment 50, wherein the UV irradiation source of the radical generator is a mercury lamp, a gas-discharge/deuterium lamp, a metal-halide arc lamp, a tungsten-halogen incandescent bulb, a light-emitting diode, a laser, a plasma extreme ultraviolet source, or a tunable vacuum UV source.

Additional Embodiment 52

The method of additional embodiment 50, wherein the UV irradiation source has a power range of 1 W or greater.

Additional Embodiment 53

The method of additional embodiment 50, wherein the radical generator comprises one or more UV irradiation sources in parallel or series.

Additional Embodiment 54

The method of additional embodiment 30, wherein the radical generator is disposed inside the radical generating reservoir so as to form an in-line flow-through UV irradiation system.

Additional Embodiment 55

The method of additional embodiment 54, wherein the target effluent is actively mixed, dwell mixed, or not mixed while in the radical generating reservoir.

Additional Embodiment 56

The method of additional embodiment 30, wherein the radical generator is positioned at a distance from and above the radical generating reservoir so as to form a top-down UV irradiation system.

Additional Embodiment 57

The method of additional embodiment 30, further comprising operatively coupling a feedback mechanism to the radical generator, and measuring an amount of UV light irradiating the target effluent, wherein the feedback mechanism ensures that the amount of UV light is greater than a predetermined threshold.

Additional Embodiment 58

The method of additional embodiment 57, wherein the feedback mechanism comprises a UV sensor (210) for measuring the amount of UV light irradiating the target effluent.

What is claimed is:

1. A passive, gravity-driven treatment system, operatively coupled to an automated slide staining apparatus, for treatment of a waste stream exiting the automated slide staining apparatus, wherein the gravity-driven treatment system comprises:
    (a) a homogenizing reservoir fluidly connected to the automated slide staining apparatus for receiving a radical initiator and said waste stream exiting the automated slide staining apparatus at a given flow rate, wherein the waste stream comprises a set of fluid components having an aqueous component containing one or more target compounds, wherein a residence time of each fluid component in the homogenizing reservoir is sufficient for promoting an even mixing of the set of fluid components to form a homogenous target effluent at or near a first outlet of the homogenizing reservoir;
    (b) a radical generating reservoir, wherein the target effluent is routed from the first outlet of the homogenizing reservoir to the radical generating reservoir via a channel, wherein gravity facilitates flow of the target effluent from the homogenizing reservoir to the radical generating reservoir;
    (c) a radical generator coupled to the radical generating reservoir, wherein the radical generator is configured to irradiate the target effluent while the target effluent is disposed in the radical generating reservoir, and promote advanced oxidation processes (AOPs) that breakdown said target compound, wherein the radical initiator is effective for accelerating said AOPs when the radical initiator is exposed to the radical generator, thus reducing a detectable concentration of the one or more target compounds and the target effluent becomes a treated effluent; and
    (d) a first disposal unit fluidically coupled to the radical generating reservoir, wherein the first disposal unit receives the treated effluent exiting from a waste outlet of the radical generating reservoir, and wherein the first disposal unit is configured such that the treated effluent is not flowed to the automated slide staining apparatus.

2. The system of claim 1, wherein the set of fluid components further comprises an oil component, wherein as a result of buoyancy, the oil component rises and floats above the aqueous component when in the homogenizing reservoir.

3. The system of claim 2, further comprising a second disposal unit for receiving the oil component draining from an oil waste outlet of the homogenizing reservoir, wherein said draining of the oil component is facilitated by gravity.

4. The system of claim 1, wherein the one or more target compounds is 3,3'-diaminobenzidine (DAB).

5. The system of claim 1, wherein the at least one target compound is 3,3'-diaminobenzidine (DAB).

6. The system of claim 1, wherein the radical generator comprises a UV irradiation source.

7. The system of claim 6, wherein the radical generator comprises one or more UV irradiation sources in parallel or series.

8. The system of claim 1, wherein the radical generator is disposed inside the radical generating reservoir so as to form an in-line flow-through UV irradiation system.

9. A passive, gravity-driven treatment system, operatively coupled to an automated slide staining apparatus, for treatment of a waste stream exiting the automated slide staining apparatus, wherein the system comprises:
    (a) a homogenizing reservoir fluidly connected to the automated slide staining apparatus for receiving the waste stream and a radical initiator, wherein the waste stream comprises an oil-phase fluid component and an aqueous fluid component containing at least one target compound, wherein as a result of buoyancy, the oil-phase fluid component rises and floats above the aqueous fluid component when in the homogenizing reservoir so as to form an upper layer of oil effluent and a lower layer of target effluent, wherein the radical initiator is disposed in the target effluent;
    (b) a radical generating reservoir fluidly connected to the homogenizing reservoir via a channel, wherein the channel is connected to a first outlet of the homogenizing reservoir and to an inlet of the radical generating reservoir, wherein the first outlet is positioned near a base of the homogenizing reservoir, wherein the inlet is positioned at or near a base of the radical generating reservoir, wherein gravity facilitates flow of the target effluent from the homogenizing reservoir to the radical generating reservoir via the channel;
    (c) a radical generator coupled to the radical generating reservoir, wherein the radical generator is configured to irradiate the target effluent while the target effluent is disposed in the radical generating reservoir, and promote advanced oxidation processes (AOPs) that breakdown said the at least one target compound, wherein the radical initiator is effective for accelerating said AOPs when the radical initiator is exposed to the radical generator, thus reducing a detectable concentration of the at least one target compound and the target effluent becomes a treated effluent;
    (d) a first disposal unit for receiving the treated effluent exiting from a waste outlet of the radical generating reservoir, and wherein the first disposal unit is configured such that the treated effluent is not flowed to automated slide staining; and
    (e) a second disposal unit for receiving the oil effluent exiting from an oil waste outlet of the homogenizing reservoir, wherein the oil waste outlet is positioned above the lower layer of target effluent so as to provide a route for gravity-facilitated drainage of the oil effluent from the homogenizing reservoir.

10. The system of claim 9, wherein a residence time of each fluid component in the homogenizing reservoir is sufficient for separating the oil-phase fluid component from the aqueous fluid component, and for an even mixing of the aqueous fluid component and the radical initiator, wherein the residence time is a function of the given flow rate and dimensions of the homogenizing reservoir.

11. A passive, gravity-driven treatment system, operatively coupled to a diagnostic system, for treatment of a waste stream exiting the diagnostic system, wherein the gravity-driven treatment system comprises:
(a) a homogenizing reservoir fluidly connected to the diagnostic system for receiving the waste stream comprising at least one target compound and one or more fluid components, wherein a residence time of each fluid component in the homogenizing reservoir is sufficient for promoting one or more of the following: i) an even mixing of aqueous fluid components to form an aqueous effluent; ii) an even mixing of non-aqueous fluid components to form a non-aqueous effluent; or iii) separation of the non-aqueous effluent from the aqueous effluent,
wherein the at least one target compound is disposed in either the non-aqueous effluent or the aqueous effluent, said effluent containing the at least one target compound is hereinafter referred to as the target effluent;
(b) a radical generating reservoir for receiving the target effluent from the homogenizing reservoir via a channel fluidly connecting the reservoirs, wherein gravity facilitates flow of the target effluent from the homogenizing reservoir to the radical generating reservoir; and
(c) a radical generator coupled to the radical generating reservoir, wherein the radical generator is configured to irradiate the target effluent while the target effluent is disposed in the radical generating reservoir, and promote advanced oxidation processes (AOPs) that breakdown said at least one target compound, thereby reducing a detectable concentration of the at least one target compound and the target effluent becomes a treated effluent;
wherein the diagnostic system comprises an automated slide staining apparatus.

12. The system of claim 11, further comprising a radical initiator that is added into the homogenizing reservoir, wherein the radical initiator is disposed in the target effluent, wherein the radical initiator is capable of accelerating the AOPs when the radical initiator is exposed to the radical generator.

13. The system of claim 11, further comprising a first disposal unit fluidically coupled to the radical generating reservoir for receiving the treated effluent, wherein the first disposal unit is configured such that the treated effluent is not flowed to the diagnostic system.

14. A method for treating a waste stream exiting an automated slide staining apparatus diagnostic system, the method comprising:
(a) providing a passive, gravity-driven treatment system of claim 1, operatively coupled to the automated slide staining apparatus;
(b) providing a radical initiator;
(c) introducing, into the homogenizing reservoir, the radical initiator and the waste stream exiting the automated slide staining apparatus at a given flow rate, wherein said waste stream comprises a set of fluid components having an aqueous component containing one or more target compounds, wherein a residence time of each fluid component in the homogenizing reservoir is sufficient for promoting an even mixing of the set of fluid components to form a target effluent;
(d) introducing the target effluent from the homogenizing reservoir into the radical generating reservoir via the channel, wherein gravity facilitates flow of the target effluent from the homogenizing reservoir to the radical generating reservoir;
(e) irradiating the target effluent, via the radical generator, while the target effluent is disposed in the radical generating reservoir, wherein said irradiation causes advanced oxidation processes (AOPs) that breakdown said one or more target compounds, wherein the radical initiator accelerates said AOPs when the radical initiator is exposed to the radical generator, thus reducing a detectable concentration of the one or more target compounds and the target effluent becomes a treated effluent; and
(f) draining the treated effluent exiting from the waste outlet of the radical generating reservoir into the first disposal unit.

15. The method of claim 14, wherein the set of fluid components further comprises an oil component, wherein as a result of buoyancy, the oil component rises and floats above the aqueous component when in the homogenizing reservoir.

16. The method of claim 15, further comprising draining the oil component exiting from an oil waste outlet of the homogenizing reservoir into a second disposal unit, wherein said draining of the oil component is facilitated by gravity.

17. The method of claim 14, wherein the at least one target compound is 3,3'-diaminobenzidine (DAB).

18. The method of claim 14, wherein the radical initiator is an ultraviolet ("UV") peroxide photo initiator, a thermal peroxide initiator, an azo thermal/photolysis initiator, a nitroxide radical initiator, an organic photosensitizer, or an inorganic semiconductor nanomaterial employed individually or in combination.

19. The method of any claim 14, wherein the radical generator comprises a UV irradiation source.

20. The method of claim 19, wherein the radical generator comprises one or more UV irradiation sources in parallel or series.

21. The method of claim 19, wherein the radical generator is disposed inside the radical generating reservoir so as to form an in-line flow-through UV irradiation system.

22. A method for treating a waste stream exiting a automated slide staining apparatus, the method comprising:
(a) providing a passive, gravity-driven treatment system of claim 9, operatively coupled to the automated slide staining apparatus;
(b) providing a radical initiator;
(c) introducing the waste stream from the automated slide staining apparatus and the radical initiator into the homogenizing reservoir, wherein said waste stream comprises an oil-phase fluid component and an aqueous fluid component containing at least one target compound, wherein as a result of buoyancy, the oil-phase fluid component rises and floats above the aqueous fluid component when in the homogenizing reservoir so as to form an upper layer of oil effluent and a lower layer of target effluent, wherein the radical initiator is disposed in the target effluent;

(d) introducing the target effluent from the homogenizing reservoir into the radical generating reservoir via the channel, wherein gravity facilitates flow of the target effluent from the homogenizing reservoir to the radical generating reservoir;

(e) irradiating the target effluent, via the radical generator, while the target effluent is disposed in the radical generating reservoir, wherein said irradiation causes advanced oxidation processes (AOPs) that breakdown said at least one target compound, wherein the radical initiator accelerates said AOPs when the radical initiator is exposed to the radical generator, thus reducing a detectable concentration of the at least one target compound and the target effluent becomes a treated effluent;

(f) draining the treated effluent exiting from the waste outlet of the radical generating reservoir into the first disposal unit; and (g) draining the oil effluent exiting from oil waste outlet of the homogenizing reservoir into the second disposal unit, wherein said draining of the oil effluent is facilitated by gravity.

23. The method of claim 22, wherein a residence time of each fluid component in the homogenizing reservoir is sufficient for separating the oil-phase fluid component from the aqueous fluid component, wherein the residence time is a function of the given flow rate and dimensions of the homogenizing reservoir.

24. A method for treating a waste stream exiting a diagnostic system, the method comprising:

(a) providing a passive, gravity-driven treatment system of claim 11, operatively coupled to the diagnostic system;

(b) introducing the waste stream from the diagnostic system into the homogenizing reservoir, wherein said waste stream comprises at least one target compound and one or more fluid components, wherein a residence time of each fluid component in the homogenizing reservoir is sufficient for promoting one or more of the following: i) an even mixing of aqueous fluid components to form an aqueous effluent; ii) an even mixing of non-aqueous fluid components to form a non-aqueous effluent; or iii) separation of the non-aqueous effluent from the aqueous effluent, wherein the at least one target compound is disposed in either the non-aqueous effluent or the aqueous effluent, said effluent containing the at least one target compound is hereinafter referred to as the target effluent;

(c) introducing the target effluent into the radical generating reservoir via the channel, wherein gravity facilitates flow of the target effluent from the homogenizing reservoir to the radical generating reservoir; and (d) irradiating the target effluent, via the radical generator, while the target effluent is disposed in the radical generating reservoir, wherein said irradiation causes advanced oxidation processes (AOPs) that breakdown said at least one target compound, thereby reducing a detectable concentration of the at least one target compound and the target effluent becomes a treated effluent.

25. The method of claim 24, further comprising introducing a radical initiator into the homogenizing reservoir, wherein the radical initiator is disposed in the target effluent and introduced into the radical generating reservoir, wherein the radical initiator accelerates the AOPs when the radical initiator is exposed to the radical generator.

26. The method of claim 24, further comprising draining the treated effluent exiting from the waste outlet of the radical generating reservoir into a first disposal unit fluidically coupled to a waste outlet of the radical generating reservoir.

27. The method of claim 24, further comprising draining the effluent without the at least one target compound exiting from a waste outlet of the homogenizing reservoir into a second disposal unit.

\* \* \* \* \*